United States Patent
Li et al.

(10) Patent No.: US 11,595,978 B2
(45) Date of Patent: Feb. 28, 2023

(54) INFORMATION PROCESSING METHOD AND APPARATUS

(71) Applicant: HUAWEI TECHNOLOGIES CO., LTD., Shenzhen (CN)

(72) Inventors: Chaojun Li, Beijing (CN); Zuomin Wu, Shenzhen (CN); Jiafeng Shao, Beijing (CN); Yunji Zhang, Xi'an (CN); Sha Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/131,643

(22) Filed: Dec. 22, 2020

(65) Prior Publication Data
US 2021/0112576 A1    Apr. 15, 2021

Related U.S. Application Data

(63) Continuation of application No. 16/147,759, filed on Sep. 30, 2018, now Pat. No. 10,897,774, which is a
(Continued)

(51) Int. Cl.
*H04L 5/00*    (2006.01)
*H04W 72/1268*    (2023.01)
(Continued)

(52) U.S. Cl.
CPC ....... *H04W 72/1268* (2013.01); *H04L 1/0068* (2013.01); *H04L 1/0071* (2013.01);
(Continued)

(58) Field of Classification Search
CPC ............. H04W 72/1268; H04W 72/04; H04W 72/0413; H04L 5/0053; H04L 1/1671;
(Continued)

(56) References Cited

U.S. PATENT DOCUMENTS

| | | | |
|---|---|---|---|
| 2011/0188594 A1* | 8/2011 | Kim | H04L 1/0073 375/316 |
| 2012/0243511 A1* | 9/2012 | Lv | H04L 1/1671 370/335 |

(Continued)

FOREIGN PATENT DOCUMENTS

| | | |
|---|---|---|
| CN | 102263617 A | 11/2011 |
| CN | 102792656 A | 11/2012 |

(Continued)

OTHER PUBLICATIONS

3GPP TS 36.212 V12. 7.0 (Dec. 2015), 3rd Generation Partnership Project; Technical Specification Group Radio Access Network; Evolved Universal Terrestrial Radio Access (E-UTRA); Multiplexing and channel coding(Release 12), 94 pages.
(Continued)

*Primary Examiner* — Lakeram Jangbahadur

(57) ABSTRACT

The present disclosure provides an information processing method and apparatus. A terminal device encodes uplink control information (UCI) to obtain coded bits of the UCI, and encodes data to obtain coded bits of the data. The terminal device multiplexes the coded bits of the UCI and the coded bits of the data to obtain a multiplexed bit sequence. The terminal device then transmits the multiplexed bit sequence to a network device via a physical uplink shared channel (PUSCH). A length of a transmission time interval of the UCI is less than or equal to 0.5 millisecond. In this way, data transmission latency can be reduced.

16 Claims, 10 Drawing Sheets

Related U.S. Application Data continuation of application No. PCT/CN2016/077931, filed on Mar. 30, 2016.

(51) Int. Cl.
    *H04L 1/00*         (2006.01)
    *H04W 72/04*       (2023.01)
    *H04L 1/1607*      (2023.01)
    *H04L 1/1812*      (2023.01)
    *H04L 27/26*       (2006.01)
    *H04L 1/1829*      (2023.01)

(52) U.S. Cl.
    CPC .......... *H04L 1/0072* (2013.01); *H04L 1/1671* (2013.01); *H04L 1/1812* (2013.01); *H04L 5/0044* (2013.01); *H04L 5/0053* (2013.01); *H04L 5/0055* (2013.01); *H04L 5/0057* (2013.01); *H04W 72/04* (2013.01); *H04L 1/0026* (2013.01); *H04L 1/0067* (2013.01); *H04L 1/1861* (2013.01); *H04L 27/26* (2013.01)

(58) Field of Classification Search
    CPC ... H04L 1/0072; H04L 5/0044; H04L 5/0055; H04L 5/0057; H04L 1/1812; H04L 1/0068; H04L 1/0071; H04L 1/1861; H04L 1/0026; H04L 1/0067; H04L 27/26; H04L 5/02; H04L 1/0042; H04L 1/0031; H04L 1/003
    See application file for complete search history.

(56) References Cited

U.S. PATENT DOCUMENTS

| | | | |
|---|---|---|---|
| 2012/0320852 A1* | 12/2012 | Seo | H03M 13/6306 370/329 |
| 2013/0235853 A1* | 9/2013 | Papasakellariou | H04L 5/0053 370/336 |
| 2014/0016600 A1 | 1/2014 | Kim et al. | |
| 2014/0369298 A1* | 12/2014 | Heo | H04L 5/0053 370/329 |
| 2015/0036618 A1 | 2/2015 | Xu et al. | |
| 2015/0333898 A1 | 11/2015 | Ji et al. | |

FOREIGN PATENT DOCUMENTS

| | | |
|---|---|---|
| CN | 104272690 A | 1/2015 |
| CN | 105409153 A | 3/2016 |
| EP | 2637347 A2 | 9/2013 |
| JP | 2012044643 A | 3/2012 |
| JP | 2012515463 A | 7/2012 |
| JP | 2013513323 A | 4/2013 |
| JP | 2013530563 A | 7/2013 |
| KR | 20120096556 A | 8/2012 |
| WO | 2016040290 A1 | 3/2016 |

OTHER PUBLICATIONS

Huawei, HiSilicon, Motivation of New SI Proposal Latency Reduction, 3GPP TSG-RAN#67 RP-150238, Mar. 3, 2015, 12 pages.

Intel Corporation, Protocol impact of TTI reduction, 3GPP TSG-RAN WG2#91 bis R2-154296, Sep. 26, 2015, 5 pages.

3GPP TS 36.212 V13.1.0 (Mar. 2016), 3rd Generation Partnership Project; Technical Specification Group Radio Access Network; Evolved Universal Terrestrial Radio Access (E-UTRA); Multiplexing and channel coding(Release 13), dated Mar. 29, 2016, total 129 pages.

R1-154033 ZTE, "UCI transmission on PUSCH for eCA", 3GPP TSG RAN WG1 Meeting #82,Beijing, China, Aug. 24-28, 2015, total 2 pages.

R1-154446 Nokia Networks,"HARQ feedback on PUSCH for up to 32 CCs", 3GPP TSG-RAN WG1 Meeting #82, Beijing, P.R. China, Aug. 24-28, 2015, total 4 pages.

3GPP TS 36.211 V13.1.0 (Mar. 2016), 3rd Generation Partnership Project; Technical Specification Group Radio Access Network; Evolved Universal Terrestrial Radio Access (E-UTRA); Physical channels and modulation(Release 13),dated Mar. 29, 2016,total 155 pages.

XP051054390 R1-161086 ASUSTeK, "Impact of shortened on uplink transmission", 3GPP TSG RAN WG1 Meeting #84, St. Julians, Malta, Feb. 15-19, 2016, total 2 pages.

XP051053984 R1-160655 LG Electronics, "Discussion on PUSCH transmission with TTI shortening", 3GPP TSG RAN WG1 Meeting #84, St. Julian's, Malta, Feb. 15-19, 2016, total 7 pages.

Ericsson, Evaluation methodology for latency reduction techniques. 3GPP TSG RAN WG1 Meeting #83 Anaheim, USA, Nov. 15-22, 2015, R1-157145, 6 pages.

\* cited by examiner

INFORMATION PROCESSING METHOD AND APPARATUS

CROSS-REFERENCE TO RELATED APPLICATION

This application is a continuation of U.S. patent application Ser. No. 16/147,759, filed on Sep. 30, 2018, which is a continuation of International Application No. PCT/CN2016/077931, filed on Mar. 30, 2016, the disclosures of which are hereby incorporated by reference in their entireties.

TECHNICAL FIELD

The present disclosure relates to communications technologies, and in particular, to an information processing method and apparatus.

BACKGROUND

Long Term Evolution (LTE) is long Term Evolution of a Universal Mobile Telecommunications System (UMTS) technical standard developed by the 3rd Generation Partnership Project (3GPP). LTE is widely applied in a wireless communications system.

In an existing LTE system, in a transmission mechanism based on a transmission time interval (TTI) of one subframe, duration of one subframe is one millisecond, each subframe is divided into two slots, a length of each slot is 0.5 millisecond, and each slot includes six or seven symbols. When uplink control information (UCI) is carried on a physical uplink shared channel (PUSCH), the UCI is multiplexed on a PUSCH whose TTI has a length of one subframe for transmission.

In the wireless communications system, a latency is one of important factors affecting user experience. Constantly emerging new services, for example, services related to the Internet of Vehicles, also have a higher requirement on the latency.

SUMMARY

Embodiments of the present disclosure provide an information processing method and apparatus to reduce a data transmission latency, and thus meet a requirement of a low latency service.

According to a first aspect, an embodiment of the present disclosure provides an information processing method. The method is described from a perspective of a terminal device. A terminal device encodes uplink control information (UCI) and data, and multiplexes coded bits of the UCI and coded bits of the data to obtain a multiplexed bit sequence. The terminal device then transmits the multiplexed bit sequence via a physical uplink shared channel (PUSCH) to a network device. A length of a transmission time interval (TTI) of the UCI is less than or equal to 0.5 millisecond.

In a possible design, a total quantity of bits of the multiplexed bit sequence is a sum of a quantity of the coded bits of the data and a quantity of the coded bits of the UCI. The multiplexed bit sequence obtained by using the mechanism may avoid a problem of demodulation performance degradation caused by a puncturing manner, thereby improving data transmission reliability.

In a possible design, the UCI includes at least one of channel quality information, hybrid automatic repeat request-acknowledgment (HARQ-ACK) information, and a rank indicator (RI).

In a possible design, a total quantity of bits of the multiplexed bit sequence is a sum of a quantity of the coded bits of the data and a quantity of coded bits of the channel quality information; or a total quantity of bits of the multiplexed bit sequence is a sum of a quantity of the coded bits of the data and a quantity of coded bits of the RI; or a total quantity of bits of the multiplexed bit sequence is a sum of a quantity of the coded bits of the data, a quantity of coded bits of the channel quality information, and a quantity of coded bits of the RI. In the multiplexed bit sequence obtained by using the mechanism, coded bits of the HARQ-ACK information may be written to the multiplexed bit sequence in a puncturing manner. This further reduces the TTI of the UCI, so that a requirement of a low latency service is met.

In a possible design, the PUSCH occupies one symbol in time domain; the UCI includes the channel quality information; in the multiplexed bit sequence, coded bits of the channel quality information are located before the coded bits of the data.

In a possible design, the PUSCH occupies one symbol in time domain; the UCI includes the RI; in the multiplexed bit sequence, coded bits of the RI are located after the coded bits of the data.

In a possible design, the PUSCH occupies one symbol in time domain; the UCI includes the HARQ-ACK information; in the multiplexed bit sequence, the HARQ-ACK information is located after the coded bits of the data.

In a possible design, the PUSCH occupies one symbol in time domain; the UCI includes the HARQ-ACK information and the RI; in the multiplexed bit sequence, the HARQ-ACK information is located before coded bits of the RI.

In the foregoing possible designs, the PUSCH occupies one symbol in time domain, and UCI of different types is located at different locations of the multiplexed bit sequence, so that the UCI can also be transmitted on a PUSCH having a one-symbol length, thereby meeting a requirement of a low latency service.

In a possible design, if the PUSCH occupies M symbols in time domain, where M is a positive integer not greater than 7, the multiplexing the coded bits of the UCI and the coded bits of the data to obtain a multiplexed bit sequence includes: determining an interleaving matrix having C columns and R rows, and mapping the coded bits of the UCI and the coded bits of the data to the interleaving matrix; and reading the multiplexed bit sequence from the interleaving matrix, where both C and R are positive integers, C is greater than or equal to M, $R=T/C$, T is a total quantity of bits of the multiplexed bit sequence, and T is a positive integer. Therefore, the length of the TTI of the UCI is less than or equal to 0.5 ms, thereby meeting a requirement of a low latency service. Moreover, the method has a simple operation process and is easy to implement.

In a possible design, the UCI includes the HARQ-ACK information; and $C=1$, 2, or 3, and coded bits of the HARQ-ACK information are located in a $k^{th}$ column of the interleaving matrix, where k is a positive integer not greater than C; or $C=6$, and coded bits of the HARQ-ACK information are located in the third column and the fourth column of the interleaving matrix; or $C=12$, and coded bits of the HARQ-ACK information are located in the third column, the fourth column, the ninth column, and the tenth column of the interleaving matrix.

In a possible design, the UCI includes the RI; and $C=2$ or 3, and coded bits of the RI are located in the second column of the interleaving matrix; or $C=6$, and coded bits of the RI are located in the second column and the fifth column of the interleaving matrix; or C=12, and coded bits of the RI are located in the second column, the fifth column, the eighth column, and the eleventh column of the interleaving matrix.

In a possible design, the UCI includes the channel quality information, and coded bits of the channel quality information are located in at least one row at the top of all columns of the interleaving matrix.

In a possible design, the UCI includes the RI and the HARQ-ACK information; C=1, 2, or 3, coded bits of the RI are located in at least one row at the end of a $k^{th}$ column of the interleaving matrix, and coded bits of the HARQ-ACK information are located in the $k^{th}$ column of the interleaving matrix and are located in at least one row above the coded bits of the RI, where k is a positive integer not greater than C; or C is greater than 1, and coded bits of the RI information and coded bits of the HARQ-ACK information are located in different columns of the interleaving matrix.

In a possible design, the UCI includes the channel quality information, the RI, and the HARQ-ACK information, and C is greater than 1; and coded bits of the RI and coded bits of the HARQ-ACK information are located in different columns of the interleaving matrix, and coded bits of the channel quality information are located in all columns of the interleaving matrix.

In the foregoing possible designs, the PUSCH occupies M symbols in time domain, and the UCI of various different types is located in the interleaving matrix in a plurality of manners. An implementation method is flexible and changeable, and operations are simple.

According to a second aspect, an embodiment of the present disclosure provides an information processing method. The method is described from a perspective of a network device. The network device receives a PUSCH that is sent by a terminal device and that is used to carry UCI whose TTI has a length less than or equal to 0.5 millisecond, and demultiplexes a multiplexed bit sequence obtained from the PUSCH to obtain coded bits of the UCI and coded bits of data. The network device decodes the coded bits of the UCI and the coded bits of the data.

In a possible design, a total quantity of bits of the multiplexed bit sequence is a sum of a quantity of the coded bits of the data and a quantity of the coded bits of the UCI. The multiplexed bit sequence obtained by using the mechanism may avoid a problem of demodulation performance degradation caused by a puncturing manner, thereby improving data transmission reliability.

In a possible design, the UCI includes at least one of channel quality information, hybrid automatic repeat request-acknowledgment HARQ-ACK information, and a rank indicator RI.

In a possible design, a total quantity of bits of the multiplexed bit sequence is a sum of a quantity of the coded bits of the data and a quantity of coded bits of the channel quality information; or a total quantity of bits of the multiplexed bit sequence is a sum of a quantity of the coded bits of the data and a quantity of coded bits of the RI; or a total quantity of bits of the multiplexed bit sequence is a sum of a quantity of the coded bits of the data, a quantity of coded bits of the channel quality information, and a quantity of coded bits of the RI. In the multiplexed bit sequence obtained by using the mechanism, coded bits of the HARQ-ACK information may be written to the multiplexed bit sequence in a puncturing manner. This further reduces the TTI of the UCI, so that a requirement of a low latency service is met.

In a possible design, the PUSCH occupies one symbol in time domain; the UCI includes the channel quality information; in the multiplexed bit sequence, coded bits of the channel quality information are located before the coded bits of the data.

In a possible design, the PUSCH occupies one symbol in time domain; the UCI includes the RI; in the multiplexed bit sequence, coded bits of the RI are located after the coded bits of the data.

In a possible design, the PUSCH occupies one symbol in time domain; the UCI includes the HARQ-ACK information; in the multiplexed bit sequence, the HARQ-ACK information is located after the coded bits of the data.

In a possible design, the PUSCH occupies one symbol in time domain; the UCI includes the HARQ-ACK information and the RI; in the multiplexed bit sequence, the HARQ-ACK information is located before coded bits of the RI.

In the foregoing possible designs, the PUSCH occupies one symbol in time domain, and UCI of different types is located at different locations of the multiplexed bit sequence, so that the UCI can also be transmitted on a PUSCH having a one-symbol length, thereby meeting a requirement of a low latency service.

In a possible design, if the PUSCH occupies M symbols in time domain, where M is a positive integer not greater than 7, the demultiplexing the multiplexed bit sequence to obtain coded bits of the UCI and coded bits of data includes: determining an interleaving matrix having C columns and R rows, writing the multiplexed bit sequence to the interleaving matrix, and obtaining the coded bits of the UCI and the coded bits of the data from the interleaving matrix, where both C and R are positive integers, C is greater than or equal to M, R=T/C, T is a total quantity of bits of the multiplexed bit sequence, and T is a positive integer. Corresponding demultiplexing is performed on a side of the network device, thereby ensuring transmission reliability of the UCI whose TTI has a length less than or equal to 0.5 ms, and meeting a requirement of a low latency service. Moreover, the method has a simple operation process and is easy to implement.

In a possible design, the UCI includes the HARQ-ACK information, and after the writing the multiplexed bit sequence to the interleaving matrix, C=1, 2, or 3, and coded bits of the HARQ-ACK information are located in a $k^{th}$ column of the interleaving matrix, where k is a positive integer not greater than C; or C=6, and coded bits of the HARQ-ACK information are located in the third column and the fourth column of the interleaving matrix; or C=12, and coded bits of the HARQ-ACK information are located in the third column, the fourth column, the ninth column, and the tenth column of the interleaving matrix.

In a possible design, the UCI includes the RI, and after the writing the multiplexed bit sequence to the interleaving matrix, C=2 or 3, and coded bits of the RI are located in the second column of the interleaving matrix; or C=6, and coded bits of the RI are located in the second column and the fifth column of the interleaving matrix; or C=12, and coded bits of the RI are located in the second column, the fifth column, the eighth column, and the eleventh column of the interleaving matrix.

In a possible design, the UCI includes the channel quality information, and after the writing the multiplexed bit sequence to the interleaving matrix, coded bits of the channel quality information are located in at least one row at the top of all columns of the interleaving matrix.

In a possible design, the UCI includes the RI and the HARQ-ACK information, and after the writing the multiplexed bit sequence to the interleaving matrix, C=1, 2, or 3, coded bits of the RI are located in at least one row at the end of a $k^{th}$ column of the interleaving matrix, and coded bits of the HARQ-ACK information are located in the $k^{th}$ column of the interleaving matrix and are located in at least one row above the coded bits of the RI, where k is a positive integer not greater than C; or C is greater than 1, and coded bits of the RI information and coded bits of the HARQ-ACK information are located in different columns of the interleaving matrix.

In a possible design, the UCI includes the channel quality information, the RI, and the HARQ-ACK information, and C is greater than 1; and after the writing the multiplexed bit sequence to the interleaving matrix, coded bits of the RI and coded bits of the HARQ-ACK information are located in different columns of the interleaving matrix, and coded bits of the channel quality information are located in all columns of the interleaving matrix.

In the foregoing possible designs, the PUSCH occupies M symbols in time domain, and the UCI of various different types is located in the interleaving matrix in a plurality of manners. An implementation method is flexible and changeable, and operations are simple.

According to a third aspect, an embodiment of the present disclosure provides a terminal device. The terminal device includes an encoding module, a multiplexing module and a sending module. The encoding module is configured to encode uplink control information UCI to obtain coded bits of the UCI and encode data to obtain coded bits of the data The multiplexing module is configured to multiplex the coded bits of the UCI and the coded bits of the data to obtain a multiplexed bit sequence. The sending module is configured to: carry the multiplexed bit sequence on a physical uplink shared channel PUSCH, and send the PUSCH to a network device, where a length of a transmission time interval TTI of the UCI is less than or equal to 0.5 millisecond.

In a possible design, a total quantity of bits of the multiplexed bit sequence is a sum of a quantity of the coded bits of the data and a quantity of the coded bits of the UCI.

In a possible design, the UCI includes at least one of channel quality information, hybrid automatic repeat request-acknowledgment HARQ-ACK information, and a rank indicator (RI).

In a possible design, a total quantity of bits of the multiplexed bit sequence is a sum of a quantity of the coded bits of the data and a quantity of coded bits of the channel quality information; or a total quantity of bits of the multiplexed bit sequence is a sum of a quantity of the coded bits of the data and a quantity of coded bits of the RI; or a total quantity of bits of the multiplexed bit sequence is a sum of a quantity of the coded bits of the data, a quantity of coded bits of the channel quality information, and a quantity of coded bits of the RI.

In a possible design, the PUSCH occupies one symbol in time domain; the UCI includes the channel quality information; in the multiplexed bit sequence, coded bits of the channel quality information are located before the coded bits of the data.

In a possible design, the PUSCH occupies one symbol in time domain; the UCI includes the RI; in the multiplexed bit sequence, coded bits of the RI are located after the coded bits of the data.

In a possible design, the PUSCH occupies one symbol in time domain; the UCI includes the HARQ-ACK information; in the multiplexed bit sequence, the HARQ-ACK information is located after the coded bits of the data.

In a possible design, the PUSCH occupies one symbol in time domain; the UCI includes the HARQ-ACK information and the RI; in the multiplexed bit sequence, the HARQ-ACK information is located before coded bits of the RI.

In a possible design, the PUSCH occupies M symbols in time domain, and M is a positive integer not greater than 7; and the multiplexing module is specifically configured to: determine an interleaving matrix, and map the coded bits of the UCI and the coded bits of the data to the interleaving matrix; and read the multiplexed bit sequence from the interleaving matrix, where a quantity of columns of the interleaving matrix is C, a quantity of rows of the interleaving matrix is R, both C and R are positive integers, C is greater than or equal to M, R=T/C, T is a total quantity of bits of the multiplexed bit sequence, and T is a positive integer.

In a possible design, the UCI includes the HARQ-ACK information; and C=1, 2, or 3, and coded bits of the HARQ-ACK information are located in a $k^{th}$ column of the interleaving matrix, where k is a positive integer not greater than C; or C=6, and coded bits of the HARQ-ACK information are located in the third column and the fourth column of the interleaving matrix; or C=12, and coded bits of the HARQ-ACK information are located in the third column, the fourth column, the ninth column, and the tenth column of the interleaving matrix.

In a possible design, the UCI includes the RI; and C=2 or 3, and coded bits of the RI are located in the second column of the interleaving matrix; or C=6, and coded bits of the RI are located in the second column and the fifth column of the interleaving matrix; or C=12, and coded bits of the RI are located in the second column, the fifth column, the eighth column, and the eleventh column of the interleaving matrix.

In a possible design, the UCI includes the channel quality information, and coded bits of the channel quality information are located in at least one row at the top of all columns of the interleaving matrix.

In a possible design, the UCI includes the RI and the HARQ-ACK information; C=1, 2, or 3, coded bits of the RI are located in at least one row at the end of a $k^{th}$ column of the interleaving matrix, and coded bits of the HARQ-ACK information are located in the $k^{th}$ column of the interleaving matrix and are located in at least one row above the coded bits of the RI, where k is a positive integer not greater than C; or C is greater than 1, and coded bits of the RI information and coded bits of the HARQ-ACK information are located in different columns of the interleaving matrix.

In a possible design, the UCI includes the channel quality information, the RI, and the HARQ-ACK information, and C is greater than 1; and coded bits of the RI and coded bits of the HARQ-ACK information are located in different columns of the interleaving matrix, and coded bits of the channel quality information are located in all columns of the interleaving matrix.

For beneficial effects of the terminal device provided in the third aspect and the various possible design manners of the third aspect, refer to the beneficial effects brought by the first aspect and the various possible design manners of the first aspect, and details are not described herein again.

According to a fourth aspect, an embodiment of the present disclosure provides a network device including a receiving module, a demultiplexing module and a decoding module. The receiving module is configured to receive a physical uplink shared channel PUSCH sent by a terminal device, where the PUSCH is used to carry uplink control information UCI, and a length of a transmission time interval TTI of the UCI is less than or equal to 0.5 millisecond. The demultiplexing module is configured to: obtain a multiplexed bit sequence from the PUSCH, and demultiplex the multiplexed bit sequence to obtain coded bits of the UCI and coded bits of data. The decoding module is configured to decode the coded bits of the UCI and the coded bits of the data.

In a possible design, a total quantity of bits of the multiplexed bit sequence is a sum of a quantity of the coded bits of the data and a quantity of the coded bits of the UCI.

In a possible design, the UCI includes at least one of channel quality information, hybrid automatic repeat request-acknowledgment HARQ-ACK information, and a rank indicator (RI).

In a possible design, a total quantity of bits of the multiplexed bit sequence is a sum of a quantity of the coded bits of the data and a quantity of coded bits of the channel quality information; or a total quantity of bits of the multiplexed bit sequence is a sum of a quantity of the coded bits of the data and a quantity of coded bits of the RI; or a total quantity of bits of the multiplexed bit sequence is a sum of a quantity of the coded bits of the data, a quantity of coded bits of the channel quality information, and a quantity of coded bits of the RI.

In a possible design, the PUSCH occupies one symbol in time domain; the UCI includes the channel quality information; in the multiplexed bit sequence, coded bits of the channel quality information are located before the coded bits of the data.

In a possible design, the PUSCH occupies one symbol in time domain; the UCI includes the RI; in the multiplexed bit sequence, coded bits of the RI are located after the coded bits of the data.

In a possible design, the PUSCH occupies one symbol in time domain; the UCI includes the HARQ-ACK information; in the multiplexed bit sequence, the HARQ-ACK information is located after the coded bits of the data.

In a possible design, the PUSCH occupies one symbol in time domain; the UCI includes the HARQ-ACK information and the RI; in the multiplexed bit sequence, the HARQ-ACK information is located before coded bits of the RI.

In a possible design, the PUSCH occupies M symbols in time domain, and M is a positive integer not greater than 7; and the demultiplexing module is specifically configured to: determine an interleaving matrix, and write the multiplexed bit sequence to the interleaving matrix; and obtain the coded bits of the UCI and the coded bits of the data from the interleaving matrix, where a quantity of columns of the interleaving matrix is C, a quantity of rows of the interleaving matrix is R, both C and R are positive integers, C is greater than or equal to M, R=T/C, T is a total quantity of bits of the multiplexed bit sequence, and T is a positive integer.

In a possible design, the UCI includes the HARQ-ACK information, and after the multiplexed bit sequence is written to the interleaving matrix, C=1, 2, or 3, and coded bits of the HARQ-ACK information are located in a $k^{th}$ column of the interleaving matrix, where k is a positive integer not greater than C; or C=6, and coded bits of the HARQ-ACK information are located in the third column and the fourth column of the interleaving matrix; or C=12, and coded bits of the HARQ-ACK information are located in the third column, the fourth column, the ninth column, and the tenth column of the interleaving matrix.

In a possible design, the UCI includes the RI, and after the multiplexed bit sequence is written to the interleaving matrix, C=2 or 3, and coded bits of the RI are located in the second column of the interleaving matrix; or C=6, and coded bits of the RI are located in the second column and the fifth column of the interleaving matrix; or C=12, and coded bits of the RI are located in the second column, the fifth column, the eighth column, and the eleventh column of the interleaving matrix.

In a possible design, the UCI includes the channel quality information, and after the multiplexed bit sequence is written to the interleaving matrix, coded bits of the channel quality information are located in at least one row at the top of all columns of the interleaving matrix.

In a possible design, the UCI includes the RI and the HARQ-ACK information, and after the multiplexed bit sequence is written to the interleaving matrix, C=1, 2, or 3, coded bits of the RI are located in at least one row at the end of a $k^{th}$ column of the interleaving matrix, and coded bits of the HARQ-ACK information are located in the $k^{th}$ column of the interleaving matrix and are located in at least one row above the coded bits of the RI, where k is a positive integer not greater than C; or C is greater than 1, and coded bits of the RI information and coded bits of the HARQ-ACK information are located in different columns of the interleaving matrix.

In a possible design, the UCI includes the channel quality information, the RI, and the HARQ-ACK information, and C is greater than 1; and after the multiplexed bit sequence is written to the interleaving matrix, coded bits of the RI and coded bits of the HARQ-ACK information are located in different columns of the interleaving matrix, and coded bits of the channel quality information are located in all columns of the interleaving matrix.

For beneficial effects of the network device provided in the fourth aspect and the various possible design manners of the fourth aspect, refer to the beneficial effects brought by the second aspect and the various possible design manners of the second aspect, and details are not described herein again.

According to a fifth aspect, an embodiment of the present disclosure provides a terminal device including a processor and a transmitter. The processor is configured to: encode uplink control information UCI to obtain coded bits of the UCI and encode data to obtain coded bits of the data; and multiplex the coded bits of the UCI and the coded bits of the data to obtain a multiplexed bit sequence. The transmitter is configured to: carry the multiplexed bit sequence on a physical uplink shared channel PUSCH, and send the PUSCH to a network device, where a length of a transmission time interval TTI of the UCI is less than or equal to 0.5 millisecond.

In a possible design, a total quantity of bits of the multiplexed bit sequence is a sum of a quantity of the coded bits of the data and a quantity of the coded bits of the UCI.

In a possible design, the UCI includes at least one of channel quality information, hybrid automatic repeat request-acknowledgment HARQ-ACK information, and a RI.

In a possible design, a total quantity of bits of the multiplexed bit sequence is a sum of a quantity of the coded bits of the data and a quantity of coded bits of the channel quality information; or a total quantity of bits of the multiplexed bit sequence is a sum of a quantity of the coded bits of the data and a quantity of coded bits of the RI; or a total quantity of bits of the multiplexed bit sequence is a sum of a quantity of the coded bits of the data, a quantity of coded bits of the channel quality information, and a quantity of coded bits of the RI.

In a possible design, the PUSCH occupies one symbol in time domain; the UCI includes the channel quality information; in the multiplexed bit sequence, coded bits of the channel quality information are located before the coded bits of the data.

In a possible design, the PUSCH occupies one symbol in time domain; the UCI includes the RI; in the multiplexed bit sequence, coded bits of the RI are located after the coded bits of the data.

In a possible design, the PUSCH occupies one symbol in time domain; the UCI includes the HARQ-ACK information; in the multiplexed bit sequence, the HARQ-ACK information is located after the coded bits of the data.

In a possible design, the PUSCH occupies one symbol in time domain; the UCI includes the HARQ-ACK information and the RI; in the multiplexed bit sequence, the HARQ-ACK information is located before coded bits of the RI.

In a possible design, the PUSCH occupies M symbols in time domain, and M is a positive integer not greater than 7; and that the processor multiplexes the coded bits of the UCI and the coded bits of the data to obtain the multiplexed bit sequence includes: The processor determines an interleaving matrix, and maps the coded bits of the UCI and the coded bits of the data to the interleaving matrix; and reads the multiplexed bit sequence from the interleaving matrix, where a quantity of columns of the interleaving matrix is C, a quantity of rows of the interleaving matrix is R, both C and R are positive integers, C is greater than or equal to M, R=T/C, T is a total quantity of bits of the multiplexed bit sequence, and T is a positive integer.

In a possible design, the UCI includes the HARQ-ACK information; and C=1, 2, or 3, and coded bits of the HARQ-ACK information are located in a $k^{th}$ column of the interleaving matrix, where k is a positive integer not greater than C; or C=6, and coded bits of the HARQ-ACK information are located in the third column and the fourth column of the interleaving matrix; or C=12, and coded bits of the HARQ-ACK information are located in the third column, the fourth column, the ninth column, and the tenth column of the interleaving matrix.

In a possible design, the UCI includes the RI; and C=2 or 3, and coded bits of the RI are located in the second column of the interleaving matrix; or C=6, and coded bits of the RI are located in the second column and the fifth column of the interleaving matrix; or C=12, and coded bits of the RI are located in the second column, the fifth column, the eighth column, and the eleventh column of the interleaving matrix.

In a possible design, the UCI includes the channel quality information, and coded bits of the channel quality information are located in at least one row at the top of all columns of the interleaving matrix.

In a possible design, the UCI includes the RI and the HARQ-ACK information; C=1, 2, or 3, coded bits of the RI are located in at least one row at the end of a $k^{th}$ column of the interleaving matrix, and coded bits of the HARQ-ACK information are located in the $k^{th}$ column of the interleaving matrix and are located in at least one row above the coded bits of the RI, where k is a positive integer not greater than C; or C is greater than 1, and coded bits of the RI information and coded bits of the HARQ-ACK information are located in different columns of the interleaving matrix.

In a possible design, the UCI includes the channel quality information, the RI, and the HARQ-ACK information, and C is greater than 1; and coded bits of the RI and coded bits of the HARQ-ACK information are located in different columns of the interleaving matrix, and coded bits of the channel quality information are located in all columns of the interleaving matrix.

For beneficial effects of the terminal device provided in the fifth aspect and the various possible design manners of the fifth aspect, refer to the beneficial effects brought by the first aspect and the various possible design manners of the first aspect, and details are not described herein again.

According to a sixth aspect, an embodiment of the present disclosure provides a network device including a receiver and a processor. The receiver is configured to receive a physical uplink shared channel PUSCH sent by a terminal device, where the PUSCH is used to carry uplink control information UCI, and a length of a transmission time interval TTI of the UCI is less than or equal to 0.5 millisecond. The processor is configured to: obtain a multiplexed bit sequence from the PUSCH, and demultiplex the multiplexed bit sequence to obtain coded bits of the UCI and coded bits of data; and decode the coded bits of the UCI and the coded bits of the data.

In a possible design, a total quantity of bits of the multiplexed bit sequence is a sum of a quantity of the coded bits of the data and a quantity of the coded bits of the UCI.

In a possible design, the UCI includes at least one of channel quality information, hybrid automatic repeat request-acknowledgment HARQ-ACK information, and a RI.

In a possible design, a total quantity of bits of the multiplexed bit sequence is a sum of a quantity of the coded bits of the data and a quantity of coded bits of the channel quality information; or a total quantity of bits of the multiplexed bit sequence is a sum of a quantity of the coded bits of the data and a quantity of coded bits of the RI; or a total quantity of bits of the multiplexed bit sequence is a sum of a quantity of the coded bits of the data, a quantity of coded bits of the channel quality information, and a quantity of coded bits of the RI.

In a possible design, the PUSCH occupies one symbol in time domain; the UCI includes the channel quality information; in the multiplexed bit sequence, coded bits of the channel quality information are located before the coded bits of the data.

In a possible design, the PUSCH occupies one symbol in time domain; the UCI includes the RI; in the multiplexed bit sequence, coded bits of the RI are located after the coded bits of the data.

In a possible design, the PUSCH occupies one symbol in time domain; the UCI includes the HARQ-ACK information; in the multiplexed bit sequence, the HARQ-ACK information is located after the coded bits of the data.

In a possible design, the PUSCH occupies one symbol in time domain; the UCI includes the HARQ-ACK information and the RI; in the multiplexed bit sequence, the HARQ-ACK information is located before coded bits of the RI.

In a possible design, the PUSCH occupies M symbols in time domain, and M is a positive integer not greater than 7; and that the processor demultiplexes the multiplexed bit sequence to obtain the coded bits of the UCI and the coded bits of data includes: The processor determines an interleaving matrix, and writes the multiplexed bit sequence to the interleaving matrix; and obtain the coded bits of the UCI and the coded bits of the data from the interleaving matrix, where a quantity of columns of the interleaving matrix is C, a quantity of rows of the interleaving matrix is R, both C and R are positive integers, C is greater than or equal to M, R=T/C, T is a total quantity of bits of the multiplexed bit sequence, and T is a positive integer.

In a possible design, the UCI includes the HARQ-ACK information, and after the multiplexed bit sequence is written to the interleaving matrix, C=1, 2, or 3, and coded bits of the HARQ-ACK information are located in a $k^{th}$ column of the interleaving matrix, where k is a positive integer not greater than C; or C=6, and coded bits of the HARQ-ACK information are located in the third column and the fourth column of the interleaving matrix; or C=12, and coded bits of the HARQ-ACK information are located in the third column, the fourth column, the ninth column, and the tenth column of the interleaving matrix.

In a possible design, the UCI includes the RI, and after the multiplexed bit sequence is written to the interleaving matrix, C=2 or 3, and coded bits of the RI are located in the second column of the interleaving matrix; or C=6, and coded bits of the RI are located in the second column and the fifth column of the interleaving matrix; or C=12, and coded bits of the RI are located in the second column, the fifth column, the eighth column, and the eleventh column of the interleaving matrix.

In a possible design, the UCI includes the channel quality information, and after the multiplexed bit sequence is written to the interleaving matrix, coded bits of the channel quality information are located in at least one row at the top of all columns of the interleaving matrix.

In a possible design, the UCI includes the RI and the HARQ-ACK information, and after the multiplexed bit sequence is written to the interleaving matrix, C=1, 2, or 3, coded bits of the RI are located in at least one row at the end of a $k^{th}$ column of the interleaving matrix, and coded bits of the HARQ-ACK information are located in the $k^{th}$ column of the interleaving matrix and are located in at least one row above the coded bits of the RI, where k is a positive integer not greater than C; or C is greater than 1, and coded bits of the RI information and coded bits of the HARQ-ACK information are located in different columns of the interleaving matrix.

In a possible design, the UCI includes the channel quality information, the RI, and the HARQ-ACK information, and C is greater than 1; and after the multiplexed bit sequence is written to the interleaving matrix, coded bits of the RI and coded bits of the HARQ-ACK information are located in different columns of the interleaving matrix, and coded bits of the channel quality information are located in all columns of the interleaving matrix.

For beneficial effects of the network device provided in the sixth aspect and the various possible design manners of the sixth aspect, refer to the beneficial effects brought by the second aspect and the various possible design manners of the second aspect, and details are not described herein again.

According to a seventh aspect, an embodiment of the present disclosure provides a communications system including a terminal device and a network device. The terminal device is configured to: encode uplink control information UCI to obtain coded bits of the UCI and encode data to obtain coded bits of the data; multiplex the coded bits of the UCI and the coded bits of the data to obtain a multiplexed bit sequence; and carry the multiplexed bit sequence on a physical uplink shared channel PUSCH, and send the PUSCH to the network device, where a length of a transmission time interval TTI of the UCI is less than or equal to 0.5 millisecond. The network device is configured to: receive the PUSCH sent by the terminal device; obtain the multiplexed bit sequence from the PUSCH, and demultiplex the multiplexed bit sequence to obtain the coded bits of the UCI and the coded bits of data; and decode the coded bits of the UCI and the coded bits of the data.

For beneficial effects of the communications system provided in the seventh aspect, refer to the beneficial effects brought by the first aspect and the second aspect, and details are not described herein again.

DESCRIPTION OF EMBODIMENTS

To make the objectives, technical solutions, and advantages of the embodiments of the present disclosure clearer, the following describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
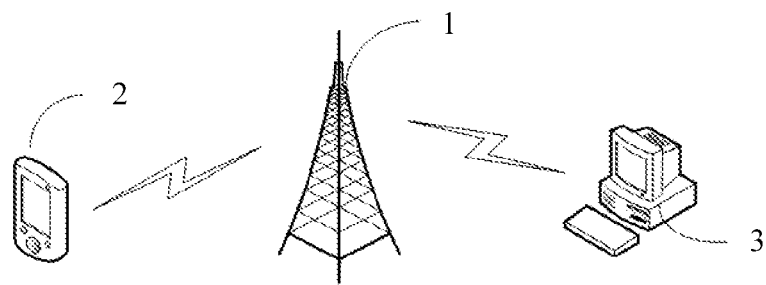
FIG. 1 is a schematic diagram of an application scenario of an information processing method according to an embodiment of the present disclosure.

FIG. 1 is a schematic diagram of an application scenario of an information processing method according to an embodiment of the present disclosure. The method may be applied to a wireless communications system, for example, a communications system such as a third generation mobile communications technology (3G), 4.5G or 5G. As shown in FIG. 1, the scenario includes a network device 1, a terminal device 2, and a terminal device 3. The information processing method is mainly used to perform short-TTI data transmission between the network device and the terminal devices. It should be noted that the scenario may further include another network device and another terminal device. FIG. 1 shows merely an example, and the present disclosure is not limited thereto.

A terminal device mentioned in this embodiment of the present disclosure may be a device that provides a user with voice and/or data connectivity, a handheld device with a wireless connection function, or another processing device connected to a wireless modem. A wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal is a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or user equipment.

The network device mentioned in this embodiment of the present disclosure may be a base station or an access point, or may be a device in communication with a wireless terminal via one or more sectors at an air interface in an access network. The base station may be configured to mutually convert a received over-the-air frame and an IP packet and serve as a router between the wireless terminal and a remaining portion of the access network. The remaining portion of the access network may include an Internet protocol (IP) network. The base station may further coordinate attribute management of the air interface. For example, the base station may be a base transceiver station (BTS) in GSM or CDMA, or may be a NodeB in WCDMA, or may be an evolved NodeB (eNB or e-NodeB) in LTE, or the like, which is not limited in this application.

For ease of understanding of this embodiment of the present disclosure, terms used in this embodiment of the present disclosure are described below first. An LTE system is used as an example for description. However, this does not mean that the information processing method provided in this embodiment of the present disclosure is suitable for only the LTE system. Actually, any wireless communications system performing data transmission through scheduling may use the information processing method provided in this embodiment of the present disclosure.

1. Frame Structure

In an existing LTE system, each radio frame includes 10 subframes having a length of 1 ms, and each subframe includes two slots. For example, for a normal cyclic prefix (CP), each slot includes seven symbols, i.e., each slot includes symbols numbered {#0, #1, #2, #3, #4, #5, #6}. For an extended CP, each slot includes six symbols, i.e., each slot includes symbols numbered {#0, #1, #2, #3, #4, #5}.

Both an uplink symbol and a downlink symbol are symbols. The uplink symbol is a single carrier-frequency division multiple access (SC-FDMA) symbol, and the downlink symbol is an orthogonal frequency division multiplexing (OFDM) symbol. It should be noted that if an uplink multiple access manner of orthogonal frequency division multiple access (OFDMA) is introduced to a subsequent technology, the uplink symbol may also be an OFDM symbol. The uplink multiple access manner and a downlink multiple access manner are not limited in the present disclosure.

2. Short TTI

In the prior art, a time domain resource occupied by a data packet whose TTI has a length of 1 ms may be equal to or less than 1 ms. For example, the first 1, 2, 3, or 4 symbols in one downlink subframe may be used to transmit a physical downlink control channel (PDCCH). Therefore, a time domain resource occupied by a downlink data packet whose TTI has a length of 1 ms may be less than 1 ms. The last one symbol in one uplink subframe may be used to transmit a sounding reference signal (SRS). Therefore, a time domain resource occupied by an uplink data packet whose TTI has a length of 1 ms may be less than 1 ms.

Figure 2:
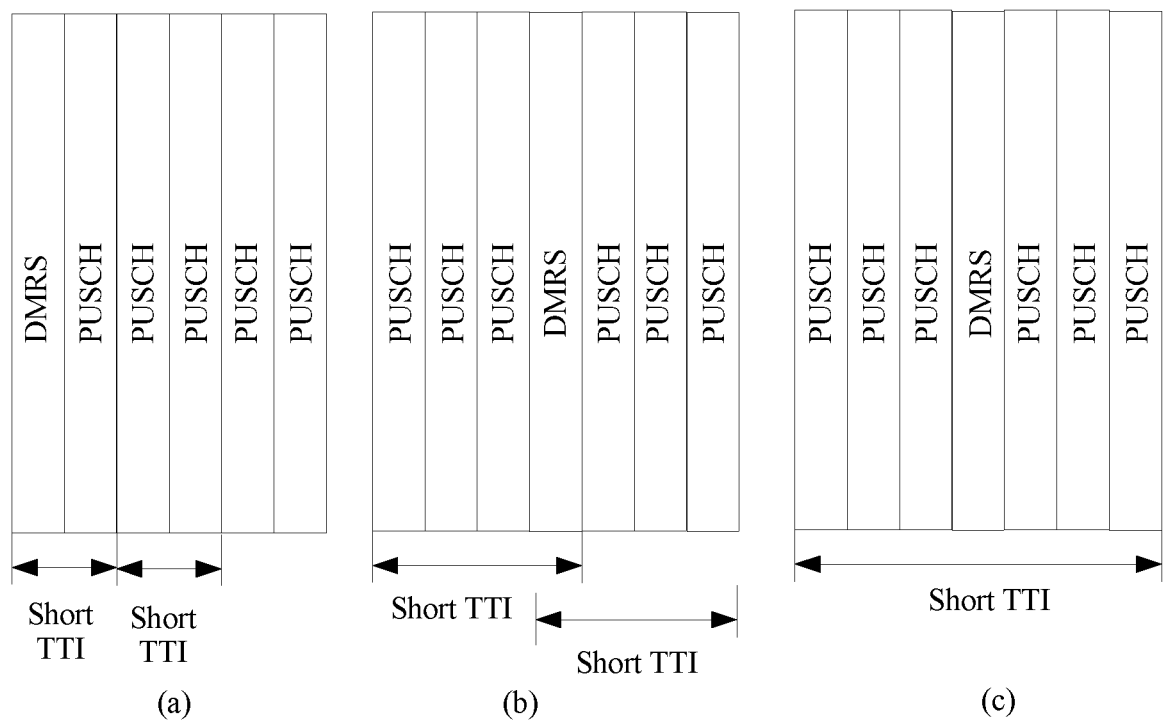
FIG. 2 is a schematic structural diagram of a short transmission time interval (TTI)

The short TTI (sTTI) is a TTI whose TTI length is less than 1 ms. For example, the length of the sTTI is one symbol, two symbols, three symbols, four symbols, six symbols, or seven symbols. Similarly, a time domain resource occupied by a data packet whose TTI has a length equal to the length of the short TTI is equal to or less than the length of the short TTI. In this application, a demodulation reference signal (DMRS) is a reference signal used to demodulate a PUSCH. Specifically, a network device performs channel estimation based on the DMRS, and then demodulates the PUSCH based on an estimated channel value. FIG. 2 is a schematic structural diagram of a short TTI. Optionally, the DMRS and the PUSCH are located on different symbols. In this case, a length of time domain occupied by the PUSCH is less than a length of a TTI of the PUSCH. For example, the length of the TTI of the PUSCH is two symbols. As shown in (a) in FIG. 2, for the first sTTI, the DMRS and the PUSCH are located in one sTTI, and the PUSCH is located on one symbol; for the second sTTI, the DMRS and the PUSCH are located in different TTIs, and the PUSCH is located on two symbols. For example, the length of the TTI of the PUSCH is four symbols. As shown in (b) in FIG. 2, the DMRS and the PUSCH are located in one sTTI, and for the first sTTI, the DMRS is located on the last symbol; for the second sTTI, the DMRS is located on the first symbol. For example, the length of the TTI of the PUSCH is seven symbols. As shown in (c) in FIG. 2, the DMRS and the PUSCH are located in one sTTI, and the DMRS is located on a fourth symbol. Optionally, the DMRS and the PUSCH are located on different resource elements (RE). That is, the DMRS and the PUSCH may be located on one symbol, but on different subcarriers. In this case, the length of time domain occupied by the PUSCH may be the same as the length of the TTI of the PUSCH.

3. Uplink Control Information

The uplink control information (UCI) includes at least one of channel quality information, a hybrid automatic repeat request-acknowledgement (HARQ-ACK) information, and a rank indicator (RI). The channel quality information includes a channel quality indicator (CQI) and/or a precoding matrix indicator (PMI). In addition, the UCI may further include channel state information-reference signal resource indicator (CRT). However, to simplify description, the CRT is not specially described in the present disclosure. It should be noted that any embodiment, in which the RI is mentioned, of the present disclosure is suitable for an "RI and/or CRT". That is, the "RI" may be replaced with the "RI and/or CRT".

After receiving downlink data, a terminal device needs to feed back a receiving result to a network device. Therefore, the HARQ-ACK information indicates a receiving status of the downlink data, and includes acknowledgement (ACK)/non-acknowledgement (NACK) information, or further includes discontinuous transmission (DTX). An ACK indicates correct reception, a NACK indicates incorrect reception, and the DTX indicates that no downlink data is received. HARQ-ACK feedback (response) information may also be the HARQ-ACK information. Preferably, the downlink data is data carried by a PDSCH or downlink semi-persistent scheduling (SPS) release signaling. The HARQ-ACK feedback information may be carried on a physical uplink control channel (PUCCH) or a physical uplink shared channel (PUSCH).

To support downlink adaptive scheduling, the terminal device needs to report channel state information (CSI) to the network device. The CSI includes a channel quality indicator (CQI), a precoding matrix indicator (PMI), a precoding type indicator (PTI), a rank indicator (RI), and/or the like. CSI reporting includes two types: periodic CSI reporting and aperiodic CSI reporting.

The information processing method and the apparatus that are provided in the embodiments of the present disclosure can resolve a technical problem that in an existing LTE system, a transmission mechanism based on a TTI of one subframe already cannot meet a requirement of a low latency service. To reduce a latency, in the present disclosure, a length of a TTI of UCI is less than or equal to 0.5 ms. However, in the prior art, the length of the TTI of the UCI is 1 ms, and the UCI is carried on a PUSCH whose TTI has a length of 1 ms. In this case, after the length of the TTI of the UCI is shortened, how to carry the UCI on the PUSCH needs a new design.

Figure 3:
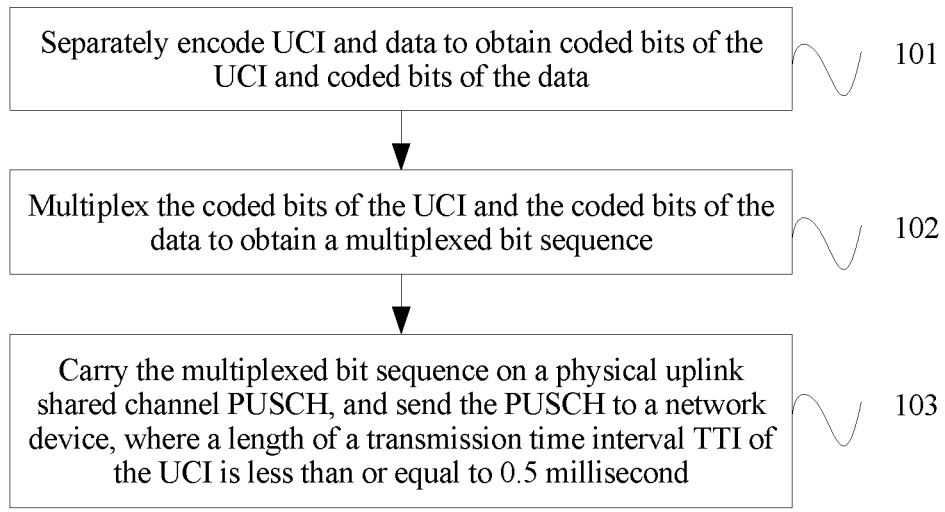
FIG. 3 is a flowchart of an information processing method according to an embodiment of the present disclosure.

FIG. 3 is a flowchart of an information processing method according to an embodiment of the present disclosure. This embodiment is executed by a terminal device. As shown in FIG. 3, the method includes the following steps:

Step 101: encode UCI to obtain coded bits of the UCI and encode data to obtain coded bits of the data.

Step 102: Multiplex the coded bits of the UCI and the coded bits of the data to obtain a multiplexed bit sequence.

Step 103: Carry the multiplexed bit sequence on a PUSCH, and send the PUSCH to a network device, where a length of a TTI of the UCI is less than or equal to 0.5 millisecond.

It should be noted that "data" in the present disclosure is, for example, uplink shared channel (UL-SCH) data. The UL-SCH is one of transport channels, and is an information transmission service that is provided from a physical layer to a Medium Access Control (MAC) layer.

When there are a plurality of UL-SCH transport blocks, or the UL-SCH data is divided into a plurality of UL-SCH transport blocks, or the PUSCH supports a plurality of code words, the terminal device multiplexes HARQ-ACK information and/or an RI and the data on the plurality of UL-SCH transport blocks, and multiplexes CQI/PMI information and the data only on one UL-SCH transport block. For example, when there are two transport blocks (including a first transport block and a second transport block), that is, the PUSCH supports a code word 0 and a code word 1, the terminal device multiplexes the HARQ-ACK information, the RI, and the data on the two transport blocks, and multiplexes the CQI/PMI information and the data only on the first transport block or the second transport block. Without loss of generality, an example of processing on one UL-SCH transport block is used for description.

In this embodiment, the length of the TTI of the UCI is less than or equal to 0.5 ms. For example, the length of the TTI of the UCI is one symbol, two symbols, three symbols, four symbols, or 0.5 ms. Optionally, a length of a TTI of the PUSCH is equal to or greater than the length of the TTI of the UCI. For example, the length of the TTI of the PUSCH is one symbol, two symbols, three symbols, four symbols, 0.5 ms, or 1 ms. In the prior art, the length of the TTI of the UCI is 1 ms, and the UCI is carried on a PUSCH whose TTI has a length of 1 ms. In this case, after the length of the TTI of the UCI is shortened, how to carry the UCI on the PUSCH needs a new design.

Optionally, the UCI includes at least one of channel quality information, HARQ-ACK information, or a RI. Preferably, TTIs of the channel quality information and the PUSCH (that is, data carried on the PUSCH) have a same length. In this case, when coded bits of the channel quality information and the coded bits of the data are scrambled, scrambling may be performed by using one scrambling sequence.

Optionally, if a transmission time interval corresponding to the HARQ-ACK information and a transmission time interval corresponding to the PUSCH overlap with each other on at least one symbol, the HARQ-ACK information is located on one or more symbols of the at least one symbol on which overlapping occurs.

Optionally, if a transmission time interval corresponding to the RI and the transmission time interval corresponding to the PUSCH overlap with each other on at least one symbol, the RI is located on one or more symbols of the at least one symbol on which overlapping occurs.

Optionally, the UCI includes a plurality of pieces of HARQ-ACK information, and the plurality of pieces of HARQ-ACK information respectively indicate receiving statuses of a plurality of pieces of downlink data. TTIs of at least two of the plurality of pieces of downlink data have different lengths, and TTIs of the plurality of pieces of HARQ-ACK information have a same length. Optionally, the plurality of pieces of HARQ-ACK information occupy a same time domain location, or at least two of the plurality of pieces of HARQ-ACK information occupy different time domain locations. Specifically, the plurality of pieces of downlink data are a plurality of PDSCHs, and TTIs of at least two of the plurality of PDSCHs have different lengths. For example, lengths of TTIs of two PDSCHs received by the terminal device are respectively two symbols and four symbols. However, a length of a TTI of HARQ-ACK information sent by the terminal device is four symbols. Optionally, before step 101, the method further includes: The terminal device receives signaling sent by the network device, where the signaling includes information used to indicate lengths of TTIs of one or more pieces of HARQ-ACK information. The signaling is higher layer signaling or physical layer signaling. In this way, in step 102, the terminal device multiplexes coded bits of the HARQ-ACK information and the coded bits of the data based on the signaling. Complexity of processing a HARQ-ACK information feedback can be reduced by using the method.

In this embodiment, the coded bits of the UCI are bits obtained by encoding original bits of the UCI. When the UCI is carried on the PUSCH, UCI of different types is independently encoded. For example, the terminal device encodes the UCI of different types according to Section 5.2.2.6 in TS36.212. It should be noted that, when both the RI and a CRI appear, joint channel coding is performed on the RI and the CRI.

The coded bits of the data are bits obtained by encoding original bits of the data. Data coding mainly includes operations, such as a cyclic redundancy check (CRC) attachment, channel coding, and rate matching. For example, according to descriptions of Section 5.2.2.1 to Section 5.2.2.5 in 3GPP specification TS 36.212, the data coding includes a transport block CRC attachment, code block segmentation, a code block CRC attachment, channel coding, rate matching, and code block concatenation.

In the information processing method provided in this embodiment, the terminal device encodes the UCI to obtain the coded bits of the UCI and encode the data to obtain the coded bits of the data. The terminal device multiplexes the coded bits of the UCI and the coded bits of the data to obtain the multiplexed bit sequence. And then the terminal device carries the multiplexed bit sequence on the PUSCH and sends the PUSCH to the network device. The length of the TTI of the UCI is not greater than 0.5 ms. In such way, a data transmission latency can be effectively reduced, so that a requirement of a low latency service is met.

In the embodiment shown in FIG. 3, if a specific manner of step 101 is determined based on a type of information included in the UCI currently needing to be transmitted, step 101 includes at least one of steps of performing, by the terminal device, channel coding on the channel quality information, performing, by the terminal device, channel coding on the RI, and performing, by the terminal device, channel coding on the HARQ-ACK information. For example, when the UCI includes the channel quality information, step 101 includes performing, by the terminal device, channel coding on the channel quality information; when the UCI includes the RI, step 101 includes performing, by the terminal device, channel coding on the RI; and when the UCI includes the HARQ-ACK information, step 101 includes performing, by the terminal device, channel coding on the HARQ-ACK information. No explicit time sequence relationship exists among the three steps.

In this embodiment, the coded bits of the UCI and the coded bits of the data are multiplexed to obtain the multiplexed bit sequence. The coded bits of the UCI may include at least one of coded bits (which are denoted as $q_0, q_1, q_2, q_3, \ldots, q_{Q-1}$) of the channel quality information, and coded bits (which are denoted as $q_0^{RI}, q_1^{RI}, q_2^{RI}, \ldots, q_{Q_{RI}-1}^{RI}$) of the RI, and coded bits (which are denoted as $q_0^{ACK}, q_1^{ACK}, q_2^{ACK}, \ldots, q_{Q_{ACK}-1}^{ACK}$) of the HARQ-ACK information. The coded bits of the data are denoted as $f_0, f_1, f_2, f_3, \ldots, f_{G-1}$ and the multiplexed bit sequence (bit sequence) obtained after multiplexing is $h_0, h_1, h_2, \ldots, h_{T-1}$. G is a quantity of the coded bits of the data, $Q_{ACK}$ is a quantity of the coded bits of the HARQ-ACK information, $Q_{RI}$ is a quantity of the coded bits of the RI, Q is a quantity of the coded bits of the channel quality information, and T is a total quantity of bits of an output bit sequence.

Optionally, in step 103, that the terminal device carries the multiplexed bit sequence on the PUSCH includes: The terminal device performs processing of scrambling, modulation, layer mapping, transform domain precoding, precoding, resource mapping, and SC-FDMA baseband signal generation on the multiplexed bit sequence $h_0, h_1, h_2, \ldots, h_{T-1}$. Further, the terminal device sends a baseband signal obtained after processing to the network device. The baseband signal obtained after processing represents the PUSCH. The transform domain precoding is discrete fourier transform (DFT).

Optionally, in step 103, that the terminal device carries the multiplexed bit sequence on the PUSCH includes: The terminal device performs processing of scrambling, modulation, layer mapping, precoding, resource mapping, and OFDM baseband signal generation on the multiplexed bit sequence $h_0, h_1, h_2, \ldots, h_{T-1}$. A baseband signal obtained after processing represents the PUSCH. Further, the terminal device sends the baseband signal obtained after processing to the network device.

It should be noted that, for a single antenna port, the processing described in the foregoing two paragraphs may not include layer mapping and precoding. In addition, if a new uplink multiple access manner is introduced later, new processing may be performed in step 103. This is not limited in the present disclosure.

Optionally, based on the embodiment shown in FIG. 3, a total quantity (which is denoted as T) of bits of the multiplexed bit sequence may be obtained by using two different mechanisms: a mechanism 1 or a mechanism 2. Specifically:

Mechanism 1

The total quantity of the bits of the multiplexed bit sequence is a sum of the quantity of the coded bits of the data and the quantity of the coded bits of the channel quality information; or the total quantity of the bits of the multiplexed bit sequence is a sum of the quantity of the coded bits of the data and the quantity of the coded bits of the RI; or the total quantity of the bits of the multiplexed bit sequence is a sum of the quantity of the coded bits of the data, the quantity of the coded bits of the channel quality information, and the quantity of the coded bits of the RI.

In the mechanism 1, the terminal device performs rate matching on the data based on the quantity of the coded bits of the RI and/or the quantity of the coded bits of the channel quality information, and/or the terminal device punctures the data based on the quantity of the coded bits of the HARQ-ACK information. In the mechanism, the total quantity T of the bits is related to the quantity of the coded bits of the data, the quantity of the coded bits of the channel quality information, and/or the quantity of the coded bits of the RI. If the UCI includes only the HARQ-ACK information, T=G. If the UCI includes only the RI, or the UCI includes the HARQ-ACK information and the RI, T=G+$Q_{RI}$. If the UCI includes only the channel quality information, or the UCI includes the HARQ-ACK information and the channel quality information, T=G+Q. If the UCI includes the RI and the channel quality information, T=G+$Q_{RI}$+Q. If the UCI includes the HARQ-ACK information, the RI, and the channel quality information, T=G+$Q_{RI}$+Q.

Mechanism 2

The total quantity of the bits of the multiplexed bit sequence is a sum of the quantity of the coded bits of the data and a quantity of the coded bits of the UCI.

In the mechanism 2, the terminal device performs rate matching on the data based on the quantity of the coded bits of the HARQ-ACK information and/or the quantity of the coded bits of the RI and/or the quantity of the coded bits of the channel quality information. In the mechanism, the total quantity T of the bits is related to the quantity of the coded bits of the data, the quantity of the coded bits of the HARQ-ACK information, the quantity of the coded bits of the channel quality information, and the quantity of the coded bits of the RI. If the UCI includes only the HARQ-ACK information, T=G+$Q_{ACK}$. If the UCI includes only the RI, T=G+$Q_{RI}$. If the UCI includes only the channel quality information, T=G+Q. If the UCI includes the HARQ-ACK information and the RI, T=G+$Q_{RI}$+$Q_{ACK}$. If the UCI includes the HARQ-ACK information and the channel quality information, T=G+Q+$Q_{ACK}$. If the UCI includes the RI and the channel quality information, T=G+$Q_{RI}$+Q. If the UCI includes the HARQ-ACK information, the RI, and the channel quality information T=G+$Q_{RI}$+Q+$Q_{ACK}$. After the TTI is shortened, if the terminal device punctures the data based on the quantity of the coded bits of the HARQ-ACK information, because a ratio of the quantity of the coded bits of the HARQ-ACK information to the quantity of the coded bits of the data may rise, demodulation performance of punctured data may degrade. In addition, after the TTI is shortened, to reduce processing time, a PUSCH resource may be pre-scheduled (that is, in a period of time, the PUSCH resource does not dynamically change). Therefore, a quantity of resource blocks (RB) cannot be increased or decreased based on a change in the quantity of the bits of the HARQ-ACK information. Therefore, to improve performance, the terminal device may perform rate matching on the data based on the quantity of the coded bits of the HARQ-ACK information.

Based on the mechanism 2, further, before step 101, the terminal device may further receive an uplink grant (UL Grant) sent by the network device. The UL grant includes scheduling information of the PUSCH. In addition, the UL grant further includes information indicating that the HARQ-ACK information occupies the PUSCH resource. Alternatively, the UL grant further includes information indicating the quantity of the bits of the HARQ-ACK information. In this way, the terminal device may perform rate matching on the data based on the quantity of the coded bits of the HARQ-ACK information. Optionally, the UL grant includes 1-bit information, and the 1-bit information is used to indicate whether the HARQ-ACK information exists. For example, "0" indicates that "no HARQ-ACK exists", and "1" indicates that "a HARQ-ACK exists". Optionally, the UL grant further includes 1-bit information, and the 1-bit information is used to indicate puncturing or rate matching. For example, "0" indicates that "the terminal device punctures the data based on the HARQ-ACK information", and "1" indicates that "the terminal device performs rate matching on the data based on the HARQ-ACK information". Optionally, the UL grant further includes information used to indicate an occupied PUSCH resource. For example, a state in 2-bit information indicates that the PUSCH is not occupied, and the other three states indicate sizes of a reserved PUSCH resource. If a quantity of resources needing to be occupied by the HARQ-ACK information exceeds a quantity of reserved resources, puncturing may be performed in an unreserved PUSCH resource.

Optionally, the terminal device may further receive control signaling sent by the network device. The control signaling is higher layer signaling or physical layer signaling, and is used to instruct the terminal device to use the mechanism 1 or the mechanism 2.

Optionally, the PUSCH occupies one symbol in time domain; the UCI includes the channel quality information; in the multiplexed bit sequence, the coded bits of the channel quality information are located before the coded bits of the data.

Optionally, the PUSCH occupies one symbol in time domain; the UCI includes the RI; in the multiplexed bit sequence, the coded bits of the RI are located after the coded bits of the data.

Optionally, the PUSCH occupies one symbol in time domain; the UCI includes the HARQ-ACK information; in the multiplexed bit sequence, the HARQ-ACK information is located after the coded bits of the data.

Optionally, the PUSCH occupies one symbol in time domain; the UCI includes the HARQ-ACK information and the RI; in the multiplexed bit sequence, the HARQ-ACK information is located before the coded bits of the RI.

How to multiplex UCI of different types when the PUSCH occupies one symbol in time domain is mainly discussed in this embodiment. If the PUSCH occupies one symbol in time domain, the length of the TTI of the PUSCH is one symbol or two symbols. It should be noted that, even if the length of the TTI of the PUSCH is two symbols, the data carried on the PUSCH is located on only one symbol, and a DMRS occupies the other symbol, that is, the first TTI in FIG. 2(*a*). Optionally, in the bit sequence $h_0$, $h_1$, $h_2$, . . . , $h_{T-1}$, the coded bits of the channel quality information are located before the coded bits of the data. That is, the terminal device concatenates the coded bits of the channel quality information before the coded bits of the data. Optionally, in the bit sequence $h_0$, $h_1$, $h_2$, . . . , $h_{T-1}$, the coded bits of the RI are located after the coded bits of the data. That is, the terminal device concatenates the coded bits of the RI after the coded bits of the data. Optionally, in the bit sequence $h_0$, $h_1$, $h_2$, . . . , $h_{T-1}$, the coded bits of the HARQ-ACK information are located after the coded bits of the data or the coded bits of the channel quality information, and/or are located before the coded bits of the RI. Optionally, the terminal device concatenates the coded bits of the HARQ-ACK information after the coded bits of the data and/or before the coded bits of the RI. Optionally, the terminal device overwrites the coded bits of the HARQ-ACK information to some coded bits of the data and/or some encoding of the channel quality information from back to front. Optionally, the coded bits of the HARQ-ACK information are discontinuously located in the bit sequence $h_0$, $h_1$, $h_2$, . . . , $h_{T-1}$. Optionally, the terminal device discontinuously overwrites the coded bits of the HARQ-ACK information to some coded bits of the data and/or some coded bits of the channel quality information.

Figure 4:
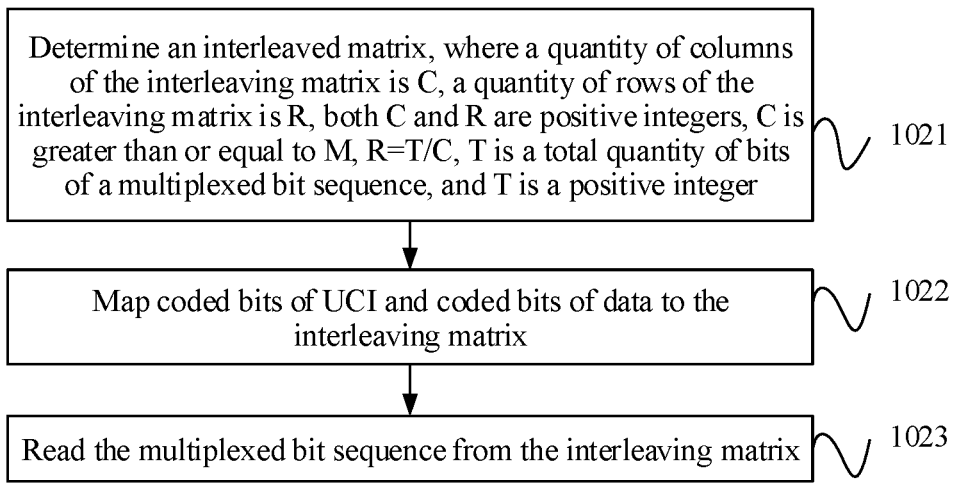
FIG. 4 is a flowchart of an information processing method according to another embodiment of the present disclosure.

FIG. 4 is a flowchart of an information processing method according to another embodiment of the present disclosure. In this embodiment, a PUSCH occupies M symbols in time domain. M is a positive integer not greater than 7 or M is equal to 12 or 10. Optionally, a length of a TTI of the PUSCH is greater than M symbols. In this case, a PUSCH DMRS and the PUSCH occupy different symbols in one TTI. Optionally, the length of the TTI of the PUSCH is equal to M symbols. In this case, the PUSCH DMRS occupies inconsecutive subcarriers. It should be noted that "multiplexing" in step 102 may also be referred to as "interleaving", that is, the coded bits of the UCI and the coded bits of the data are interleaved to obtain an interleaved bit sequence. As shown in FIG. 4, an implementation of step 102 includes the following steps:

Step 1021: Determine an interleaving matrix, where a quantity of columns of the interleaving matrix is C, a quantity of rows of the interleaving matrix is R, both C and R are positive integers, C is greater than or equal to M, R=T/C, T is a total quantity of bits of the multiplexed bit sequence, and T is a positive integer.

The rows of the interleaving matrix may be numbered 0, 1, 2, . . . , and R−1 from top to bottom, and the columns of the matrix may be numbered 0, 1, . . . , and C−1 from left to right.

Optionally, C=M. In this case, a terminal device may determine the interleaving matrix based on the total quantity T of the bits of the multiplexed bit sequence and the quantity M of symbols occupied by the PUSCH in time domain. For example, if the quantity M of symbols occupied by the PUSCH in time domain is equal to 3, the total quantity T of the bits of the multiplexed bit sequence is equal to 12, and C=3, R=4.

Optionally, C>M. In this case, the terminal device determines the interleaving matrix based on the total quantity T of the bits of the multiplexed bit sequence. For example, if the quantity M of symbols occupied by the PUSCH in time domain is equal to 3, the total quantity T of the bits of the multiplexed bit sequence is equal to 12, and C=4, R=3.

Step 1022: Map the coded bits of the UCI and the coded bits of the data to the interleaving matrix.

Step 1023: Read the multiplexed bit sequence from the interleaving matrix.

Preferably, the terminal device reads the multiplexed bit sequence from the interleaving matrix column by column.

Figure 5:
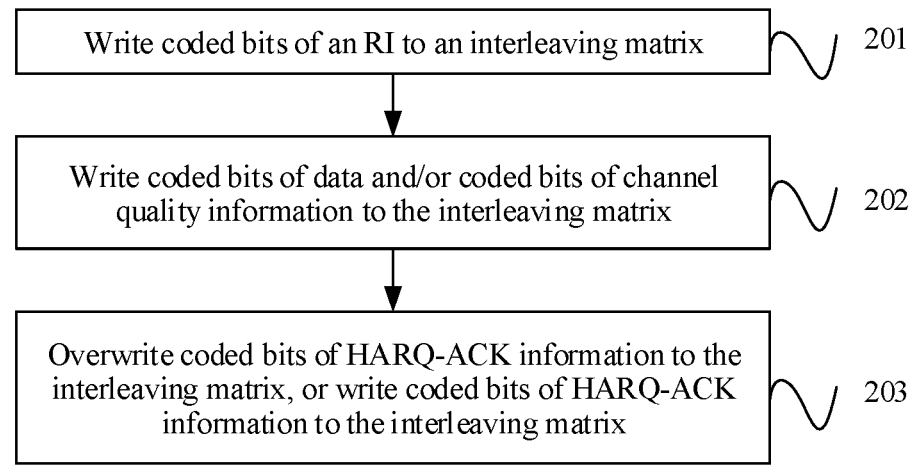
FIG. 5 is a flowchart of an information processing method according to yet another embodiment of the present disclosure.

In this embodiment, the coded bits of the UCI and the coded bits of the data may be mapped to the interleaving matrix by selecting a corresponding method based on a type of the information included in the UCI and the foregoing mechanism for calculating the total quantity of the bits of the multiplexed bit sequence. FIG. 5 is a flowchart of an information processing method according to yet another embodiment of the present disclosure. In the method provided in this embodiment, the UCI includes at least one of an RI, HARQ-ACK information, and channel quality information. As shown in FIG. 5, step 1022 includes the following steps:

Step 201: Write coded bits of the RI to the interleaving matrix.

Step 202: Write the coded bits of data and/or coded bits of the channel quality information to the interleaving matrix.

Step 203: Overwrite coded bits of the HARQ-ACK information to the interleaving matrix, or write coded bits of the HARQ-ACK information to the interleaving matrix.

In this embodiment, writing is to write the coded bits of the UCI or the coded bits of the data to the interleaving matrix in a newly writing manner, and overwriting is to write the coded bits of the UCI to the interleaving matrix in an overwriting manner.

Optionally, if the UCI includes the RI, the terminal device performs step 201; or if the UCI does not include the RI, the terminal device does not perform step 201.

Optionally, in step 202, if the UCI includes the channel quality information, the terminal device writes the coded bits of the data and the coded bits of the channel quality information to the interleaving matrix. If the UCI does not include the channel quality information, the terminal device writes the coded bits of the data to the interleaving matrix.

Optionally, the coded bits of the data and/or the coded bits of the channel quality information and the coded bits of the RI are located at different locations in the interleaving matrix.

Optionally, the terminal device writes the coded bits of the data and/or the coded bits of the channel quality information to the interleaving matrix row by row (row by row or rows by rows). In this way, step 202 and step 1023 are combined for use. That is, the coded bits of the data and/or the coded bits of the channel quality information are written row by row and read column by column, and this implements an interleaving function.

Optionally, in step 203, if the mechanism 1 is used, step 203 is: the terminal device overwrites the coded bits of the HARQ-ACK information to the interleaving matrix. The operation overwrites some coded bits of the data and/or some coded bits of the channel quality information. That is, the terminal device punctures some coded bits (alternatively, some coded bits of the data and/or some coded bits of the channel quality information) in the interleaving matrix, and the some punctured bits are filled with a coded bit sequence of the HARQ-ACK information.

Optionally, in step 203, if the mechanism 2 is used, step 203 is: the terminal device writes the coded bits of the HARQ-ACK information to the interleaving matrix.

If the UCI includes the HARQ-ACK information, the terminal device performs step 203; or if the UCI does not include the HARQ-ACK information, the terminal device does not perform step 203.

It should be noted that no explicit time sequence relationship exists among step 201, step 202, and step 203. Preferably, when the mechanism 1 is used, step 203 is performed after step 202.

In the information processing method provided in this embodiment, the C*R interleaving matrix is determined first, and the coded bits of the UCI and the coded bits of the data are mapped to the interleaving matrix, so that the length of the TTI of the UCI is less than or equal to 0.5 ms, thereby meeting a requirement of a low latency service. The method has a simple operation process and is easy to implement.

Figure 6:
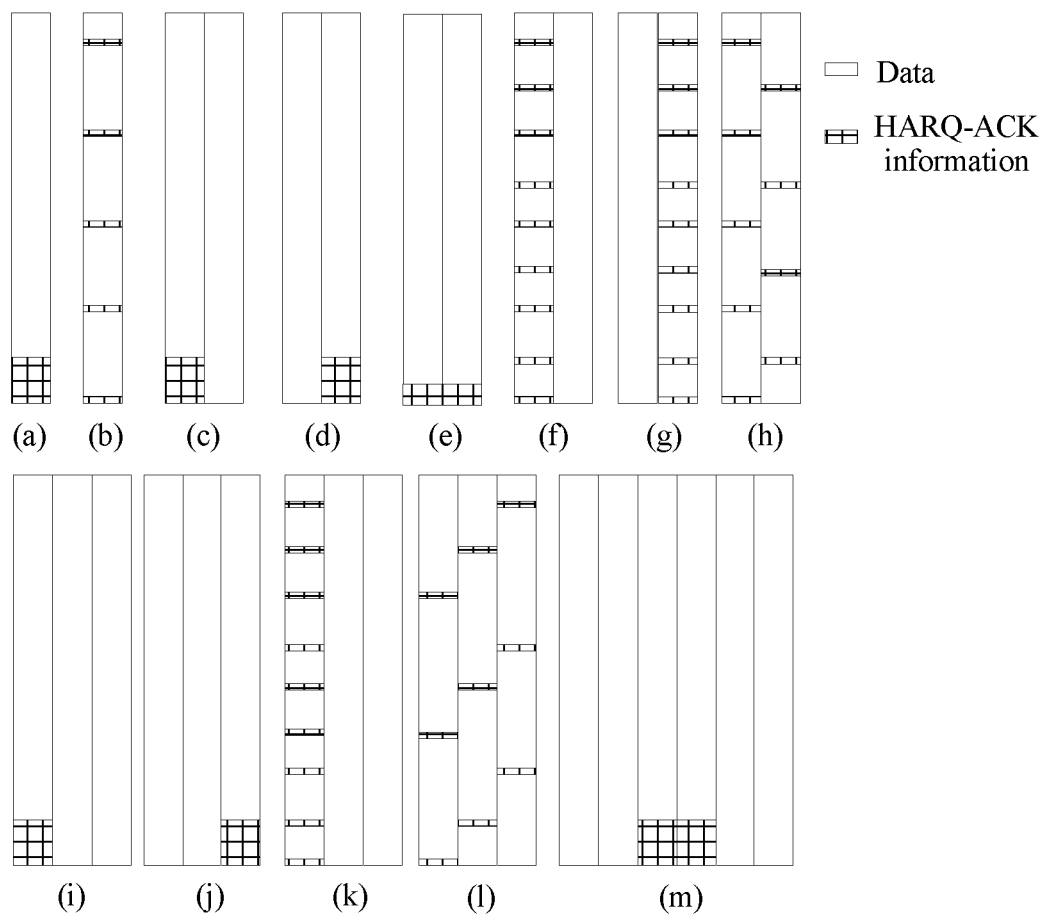
FIG. 6 is a schematic diagram of an interleaving matrix according to an embodiment of the present disclosure.

FIG. 6 is a schematic diagram of an interleaving matrix according to an embodiment of the present disclosure. UCI includes HARQ-ACK information. (a) to (m) in FIG. 6 show specific locations, to which coded bits of the HARQ-ACK information are mapped, in the interleaving matrix.

Optionally, the coded bits of the HARQ-ACK information are located in a $k^{th}$ column of the interleaving matrix, where k is a positive integer not greater than C. Specifically, the coded bits of the HARQ-ACK information are located in at least one row at the end of the $k^{th}$ column of the interleaving matrix. Preferably, C=1, 2, or 3. For example, as shown in (a), (c), or (i) in FIG. 6, the coded bits of the HARQ-ACK information are located in the first column and at least one row at the end of the interleaving matrix. As shown in (d) or (j) in FIG. 6, the coded bits of the HARQ-ACK information are located in at least one row at the end of the last column of the interleaving matrix. Optionally, a length of a TTI of the HARQ-ACK information is less than a length of a TTI of a PUSCH, and the terminal device determines a value of k based on a time domain location needing to be fed back by the HARQ-ACK information. For example, the length of the TTI of the PUSCH is seven or four symbols (where M=6 or M=3 or 4), the length of the TTI of the HARQ-ACK information is two symbols, and the terminal device determines that C=6 or C=3 or 4. When the TTI occupied by the HARQ-ACK information is a first symbol and a second symbol in the TTI occupied by the PUSCH, k=1 or 2. Alternatively, when the TTI occupied by the HARQ-ACK information is a third symbol and a fourth symbol in the TTI occupied by the PUSCH, k=3 or 4. Alternatively, when the TTI occupied by the HARQ-ACK information is a fifth symbol and a sixth symbol in the TTI occupied by the PUSCH, k=5 or 6.

Optionally, the UCI includes a plurality of pieces of HARQ-ACK information, and a plurality of TTIs corresponding to the plurality of pieces of HARQ-ACK information are all located in the TTI occupied by the PUSCH. A length of a TTI of any one of the plurality of pieces of HARQ-ACK information is less than the length of the TTI of the PUSCH. In this case, coded bits of any one of the plurality of pieces of HARQ-ACK information are located in the $k^{th}$ column of the interleaving matrix, and k is a positive integer not greater than C. The terminal device determines the value of k based on a time domain location needing to be fed back by any piece of the HARQ-ACK information. For example, the length of the TTI of the PUSCH is seven symbols (where M=6), the terminal device determines that C=6, the UCI includes two pieces of HARQ-ACK information whose TTI has a length of two symbols, and coded bits of the two pieces of HARQ-ACK information are located in the first column and the third column of the interleaving matrix respectively.

Optionally, C is greater than 1, and the coded bits of the HARQ-ACK information are located in at least two columns of the interleaving matrix. In any one of the at least two columns, the coded bits of the HARQ-ACK information are located in at least one row at the end. For example, as shown in (e) in FIG. 6, the coded bits of the HARQ-ACK information are located in all columns of the interleaving matrix. For example, as shown in (m) in FIG. 6, C=6, and the coded bits of the HARQ-ACK information are located in the third column and the fourth column (that is, columns numbered 2 and 3) of the interleaving matrix. For example, C=12, and the coded bits of the HARQ-ACK information are located in the third column, the fourth column, the ninth column, and the tenth column (that is, columns numbered 2, 3, 8, and 9) of the interleaving matrix.

Optionally, the coded bits of the HARQ-ACK information are discontinuously distributed in the $k^{th}$ column or at least two columns of the interleaving matrix, and k is a positive integer not greater than C, for example, k=1 or C. Preferably, C=1, 2, or 3. For example, as shown in (b), (f), (g), or (k) in FIG. 6, the coded bits of the HARQ-ACK information are discontinuously distributed in the first column or the last column of the interleaving matrix. Specifically, the terminal device discontinuously (over)writes the coded bits of the HARQ-ACK information to the first column or the last column of the interleaving matrix. For example, as shown in (h) or (l) in FIG. 6, the coded bits of the HARQ-ACK information are discontinuously distributed in all columns of the interleaving matrix. Specifically, the terminal device discontinuously (over)writes the coded bits of the HARQ-ACK information to all the columns of the interleaving matrix. Compared with centralized distribution of the quantity of coded bits of the HARQ-ACK information, when the coded bits of the HARQ-ACK information are discontinuously distributed in the interleaving matrix, the terminal device discontinuously punctures the data, so that degradation of data demodulation performance caused by centralized puncturing can be reduced.

Optionally, if the PUSCH (or the data carried on the PUSCH, which is referred to as data for short) is located on M symbols (where M is 1, 2, 3, 4, or 5), the interleaving matrix may also include C columns (C>M), and the coded bits of the HARQ-ACK information are located in at least two columns of the interleaving matrix; and/or the coded bits of the RI are located in at least two columns of the interleaving matrix. For example, the PUSCH is located on one, two, three, or four symbols. However, as shown in (m) in FIG. 6, C=6, and the coded bits of the HARQ-ACK information are located in the third column and the fourth column in the interleaving matrix. In this way, the coded bits of the HARQ-ACK information are discontinuously distributed in the bit sequence. Compared with that the quantity of the coded bits of the HARQ-ACK information is distributed in the bit sequence in a centralized manner, when the coded bits of the HARQ-ACK information are discontinuously distributed in the bit sequence, the terminal device discontinuously punctures the data, so that degradation of data demodulation performance caused by puncturing can be reduced.

Figure 7:
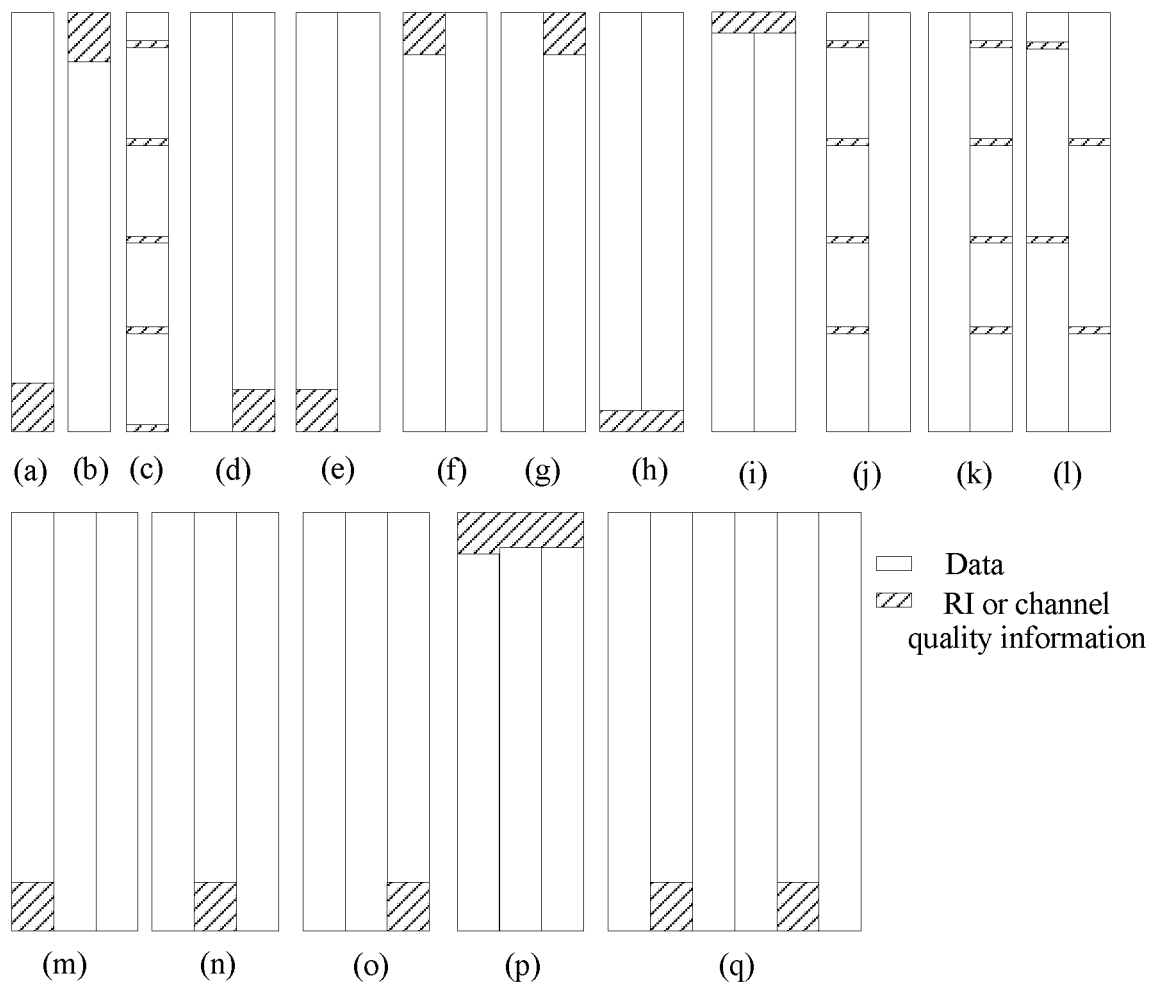
FIG. 7 is a schematic diagram of another interleaving matrix according to an embodiment of the present disclosure.

FIG. 7 is a schematic diagram of another interleaving matrix according to an embodiment of the present disclosure. UCI includes an RI or channel quality information. Using (a) to (q) in FIG. 7 below as an example, specific locations, to which coded bits of the RI or coded bits of the channel quality information are mapped, in the interleaving matrix are described in detail.

Optionally, C=2 or 3, and the coded bits of the RI are located in the second column of the interleaving matrix; or C=6, and the coded bits of the RI are located in the second column and the fifth column of the interleaving matrix; or C=12, and the coded bits of the RI are located in the second column, the fifth column, the eighth column, and the eleventh column of the interleaving matrix.

Optionally, the UCI includes the channel quality information, and the coded bits of the channel quality information are located in at least one row at the top of all columns of the interleaving matrix.

Optionally, the coded bits of the channel quality information or the coded bits of the RI are located in a $k^{th}$ column of the interleaving matrix, where k is a positive integer not greater than C. For example, k=1 or C. Specifically, the coded bits of the RI or the coded bits of the channel quality information are located in the $k^{th}$ column and at least one row at the end or at the top of the interleaving matrix. Preferably, C=1, 2, or 3. For example, as shown in (a), (e), or (m) in FIG. 7, the coded bits of the RI or the coded bits of the channel quality information are located in the first column and at least one row at the end of the interleaving matrix. For example, as shown in (d) or (o) in FIG. 7, the coded bits of the RI or the coded bits of the channel quality information are located in the last column and at least one row at the end of the interleaving matrix. For example, as shown in (n) in FIG. 7, C=3, and the coded bits of the RI or the coded bits of the channel quality information are located in the second column and at least one row at the end of the interleaving matrix. For example, as shown in (b) or (f) in FIG. 7, the coded bits of the RI or the coded bits of the channel quality information are located in the first column and at least one row at the top of the interleaving matrix. For example, as shown in (g) in FIG. 7, the coded bits of the RI or the coded bits of the channel quality information are located in the last column and at least one row at the top of the interleaving matrix. Optionally, a length of a TTI of the RI is less than a length of a TTI of the PUSCH, and the terminal device determines a value of k based on a time domain location of the RI. For example, the length of the TTI of the PUSCH is seven or four symbols (where M=6 or M=3 or 4), the length of the TTI of the RI is two symbols, and the terminal device determines that C=6 or C=3 or 4. When the TTI occupied by the RI is the first symbol and the second symbol in the TTI occupied by the PUSCH, k=1 or 2. Alternatively, when the TTI occupied by the RI is the third symbol and the fourth symbol in the TTI occupied by the PUSCH, k=3 or 4. Alternatively, when the TTI occupied by the RI is the fifth symbol and the sixth symbol in the TTI occupied by the PUSCH, k=5 or 6.

Optionally, the UCI includes a plurality of RIs, and a plurality of TTIs corresponding to the plurality of RIs are all located in the TTI occupied by the PUSCH. A length of a TTI of any one of the plurality of RIs is less than the length of the TTI of the PUSCH. In this case, coded bits of any RI are located in the $k^{th}$ column of the interleaving matrix, k is a positive integer not greater than C, and the terminal device determines the value of k based on a time domain location of any RI. For example, the length of the TTI of the PUSCH is seven symbols (where M=6), the terminal device determines that C=6, the UCI includes two RIs whose TTI has a length of two symbols, and coded bits of the two RIs are located in the second column and the third column of the interleaving matrix respectively.

Optionally, the coded bits of the RI or the coded bits of the channel quality information are located in at least two columns of the interleaving matrix. In addition, in any one of the at least two columns, the coded bits of the RI or the coded bits of the channel quality information are located in at least one row at the end or the top. For example, as shown in (h) in FIG. 7, the coded bits of the RI or the coded bits of the channel quality information are located in all columns and at least one row at the end of the interleaving matrix. For example, as shown in (i) or (p) in FIG. 7, the coded bits of the RI or the coded bits of the channel quality information are located in all columns and at least one row at the top of the interleaving matrix. For example, as shown in (q) in FIG. 7, C=6, and the coded bits of the RI or the coded bits of the channel quality information are located in the second column and the fifth column (that is, columns numbered 1 and 4) of the interleaving matrix. For example, C=12, and the coded bits of the RI or the coded bits of channel quality information are located in the second column, the fifth column, the eighth column, and the eleventh column (that is, columns numbered 1, 4, 7, and 10) of the interleaving matrix.

Optionally, the coded bits of the RI or the coded bits of the channel quality information are discontinuously distributed in the $k^{th}$ column or at least two columns of the interleaving matrix, and k is a positive integer not greater than C, for example, k=1 or C. For example, as shown in (c), (j), or (k) in FIG. 7, the coded bits of the RI or the coded bits of the channel quality information are discontinuously distributed in the first column or the last column of the interleaving matrix. Specifically, the terminal device discontinuously writes the coded bits of the RI or the coded bits of the channel quality information to the first column or the last column of the interleaving matrix. For example, as shown in (l) in FIG. 7, the coded bits of the RI or the coded bits of the channel quality information are discontinuously located in all columns of the interleaving matrix. Specifically, the terminal device discontinuously writes the coded bits of the RI or the coded bits of the channel quality information to all the columns of the interleaving matrix.

Figure 8:
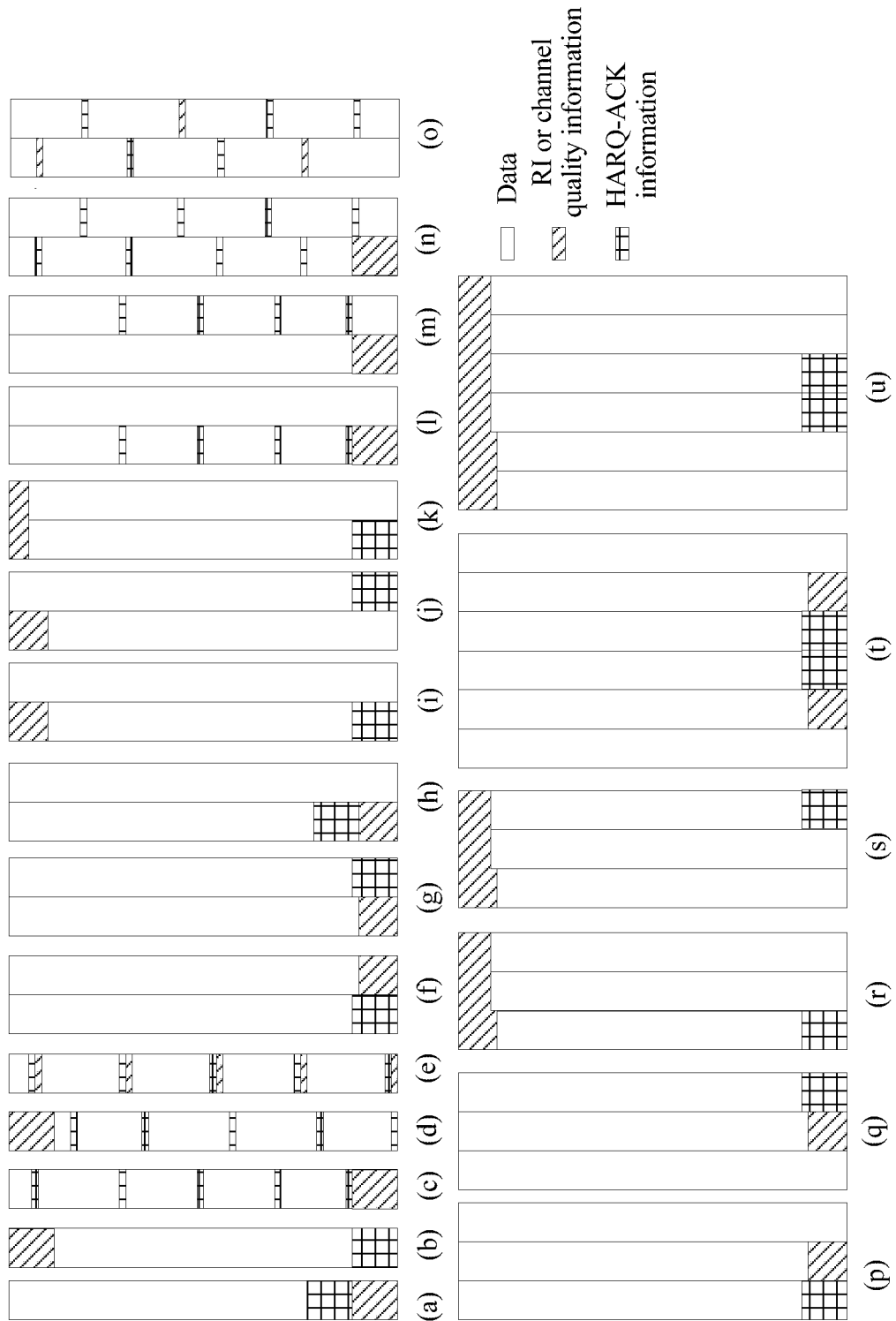
FIG. 8 is a schematic diagram of another interleaving matrix according to an embodiment of the present disclosure.

FIG. 8 is a schematic diagram of another interleaving matrix according to an embodiment of the present disclosure. UCI includes an RI and HARQ-ACK information, or UCI includes channel quality information and HARQ-ACK information. Using (a) to (u) in FIG. 8 below as an example, a method for mapping coded bits of the UCI and coded bits of data is described in detail.

Optionally, coded bits of the RI or coded bits of the channel quality information and coded bits of the HARQ-ACK information are located in one column of the interleaving matrix, for example, a $k^{th}$ column, where k is a positive integer not greater than C. For example, k=1 or C, that is, the first column or the last column. Preferably, C=1, 2, or 3, for example, as shown in (a), (b), (c), (d), (e), (h), (i), and (l) in FIG. 8. Optionally, the coded bits of the RI or the coded bits of the channel quality information are located in at least one row ($Q_{RI}$ row/rows or Q row/rows) at the end of the $k^{th}$ column of the interleaving matrix, and the coded bits of the HARQ-ACK information are located in the $k^{th}$ column of the interleaving matrix and are located in at least one row ($Q_{ACK}$ row/rows) above the coded bits of the RI or the coded bits of the channel quality information, for example, as shown in (a) and (h) in FIG. 8. Optionally, the coded bits of the RI or the coded bits of the channel quality information are located in $Q_{RI}$ rows or Q rows at the top of the $k^{th}$ column of the interleaving matrix, and the coded bits of the HARQ-ACK information are located in $Q_{ACK}$ rows at the end of the $k^{th}$ column of the interleaving matrix, for example, as shown in (b) and (i) in FIG. 8. Optionally, the coded bits of the RI or the coded bits of the channel quality information are located in $Q_{RI}$ rows or Q rows at the end of the $k^{th}$ column of the interleaving matrix, and the coded bits of the HARQ-ACK information are discontinuously distributed in the $k^{th}$ column of the interleaving matrix, for example, as shown in (c) and (l) in FIG. 8. Optionally, the coded bits of the RI or the coded bits of the channel quality information are located in $Q_{RI}$ rows or Q rows at the top of the $k^{th}$ column of the interleaving matrix, and the coded bits of the HARQ-ACK information are discontinuously distributed in the $k^{th}$ column of the interleaving matrix, for example, as shown in (d) in FIG. 8. Optionally, the coded bits of the RI or the coded bits of the channel quality information and the coded bits of the HARQ-ACK information are discontinuously distributed in the $k^{th}$ column of the interleaving matrix, for example, as shown in (e) in FIG. 8.

Optionally, C is greater than 1, and the coded bits of the RI or the coded bits of the channel quality information and the coded bits of the HARQ-ACK information are located in different columns of the interleaving matrix. For example, the coded bits of the HARQ-ACK information are located in the first column, and the coded bits of the RI or the coded bits of the channel quality information are located in the second column, as shown in (f) and (p) in FIG. 8. For example, the coded bits of the HARQ-ACK information are located in the second column, and the coded bits of the RI or the coded bits of the channel quality information are located in the first column, as shown in (g), (j), and (m) in FIG. 8. For example, the coded bits of the HARQ-ACK information are located in the third column, and the coded bits of the RI or the coded bits of the channel quality information are located in the second column, as shown in (q) in FIG. 8. For example, when C=4, the coded bits of the HARQ-ACK information are located in the second column and the third column, and the coded bits of the RI or the coded bits of the channel quality information are located in the first column and the fourth column. For example, when C=4, the coded bits of the HARQ-ACK information are located in the second column and the fourth column, and the coded bits of the RI or the coded bits of the channel quality information are located in the first column and the third column. For example, when C=6, as shown in (t) in FIG. 8, the coded bits of the HARQ-ACK information are located in the third column and the fourth column, and the coded bits of the RI or the coded bits of the channel quality information are located in the second column and the fifth column. For example, when C=8, the coded bits of the HARQ-ACK information are located in the second column, the fourth column, the sixth column, and the eighth column, and the coded bits of the RI or the coded bits of the channel quality information are located in the first column, the third column, the fifth column, and the seventh column. For example, when C=12, the coded bits of the HARQ-ACK information are located in the third column, the fourth column, the ninth column, and the tenth column (that is, columns numbered 2, 3, 8, and 9), and the coded bits of the RI or the coded bits of the channel quality information are located in the second column, the fifth column, the eighth column, and the eleventh column (that is, columns numbered 1, 4, 7, and 10).

Optionally, C is greater than 1, the coded bits of the HARQ-ACK information are located in the $k^{th}$ column of the interleaving matrix, and the coded bits of the RI or the coded bits of the channel quality information are located in at least two columns of the interleaving matrix, where k is a positive integer not greater than C. For example, k=1 or C, that is, the first column or the last column. For example, the coded bits of the HARQ-ACK information are located in the first column or the last column of the interleaving matrix, and the coded bits of the RI or the coded bits of the channel quality information are located in all columns of the interleaving matrix, as shown in (k), (f), and (s) in FIG. 8.

Optionally, C is greater than 1, and a quantity of columns, which are occupied by the coded bits of the HARQ-ACK information, of the interleaving matrix is less than a quantity of columns, which are occupied by the coded bits of the RI or the coded bits of the channel quality information, of the interleaving matrix. As shown in (u) in FIG. 8, the coded bits of the HARQ-ACK information are located in the third column and the fourth column of the interleaving matrix, and the coded bits of the RI or the coded bits of the channel quality information are located in all columns of the interleaving matrix.

Optionally, the coded bits of the HARQ-ACK information are continuously (that is, in a centralized manner) distributed in at least one column of the interleaving matrix, and the coded bits of the RI or the coded bits of the channel quality information are continuously distributed in at least one column of the interleaving matrix, as shown in (a), (b), (f), (g), (h), (i), (j), (k), (p), (q), (r), (s), (t), and (u) in FIG. 8. It should be noted that "continuous distribution" means "occupation of one or more consecutive rows". For example, the coded bits of the HARQ-ACK information are continuously distributed in at least one column of the interleaving matrix. That is, in any column occupied by the coded bits of the HARQ-ACK information, the coded bits of the HARQ-ACK information occupy one or more consecutive rows. Optionally, the coded bits of the HARQ-ACK information are located in one or more rows at the end of the interleaving matrix, and the coded bits of the RI or the coded bits of the channel quality information are located in one or more rows at the top of the interleaving matrix, as shown in (b), (i), (j), (k), (r), (s), and (u) in FIG. 8. Optionally, the coded bits of the HARQ-ACK information and the coded bits of the RI or the coded bits of the channel quality information are located in one or more rows at the end of the interleaving matrix, as shown in (a), (f), (g), (h), (p), (q), and (t) in FIG. 8.

Optionally, the coded bits of the HARQ-ACK information are discontinuously (that is, in a dispersed or distributed manner) distributed in one column or at least two columns or all columns of the interleaving matrix, and the coded bits of the RI or the coded bits of the channel quality information are continuously distributed in one column or at least two columns or all columns of the interleaving matrix, as shown in (c), (d), (l), (m), and (n) in FIG. 8. It should be noted that "discontinuous distribution" means "occupation of a plurality of inconsecutive rows". For example, the coded bits of the HARQ-ACK information are discontinuously distributed in one column or at least two columns or all columns of the interleaving matrix. That is, in any column occupied by the coded bits of the HARQ-ACK information, the coded bits of the HARQ-ACK information occupy a plurality of inconsecutive rows.

Optionally, the coded bits of the HARQ-ACK information are discontinuously distributed in one column or at least two columns or all columns of the interleaving matrix, and the coded bits of the RI or the coded bits of the channel quality information are discontinuously distributed in one column or at least two columns or all columns of the interleaving matrix, as shown in (e) and (o) in FIG. 8.

Figure 9:
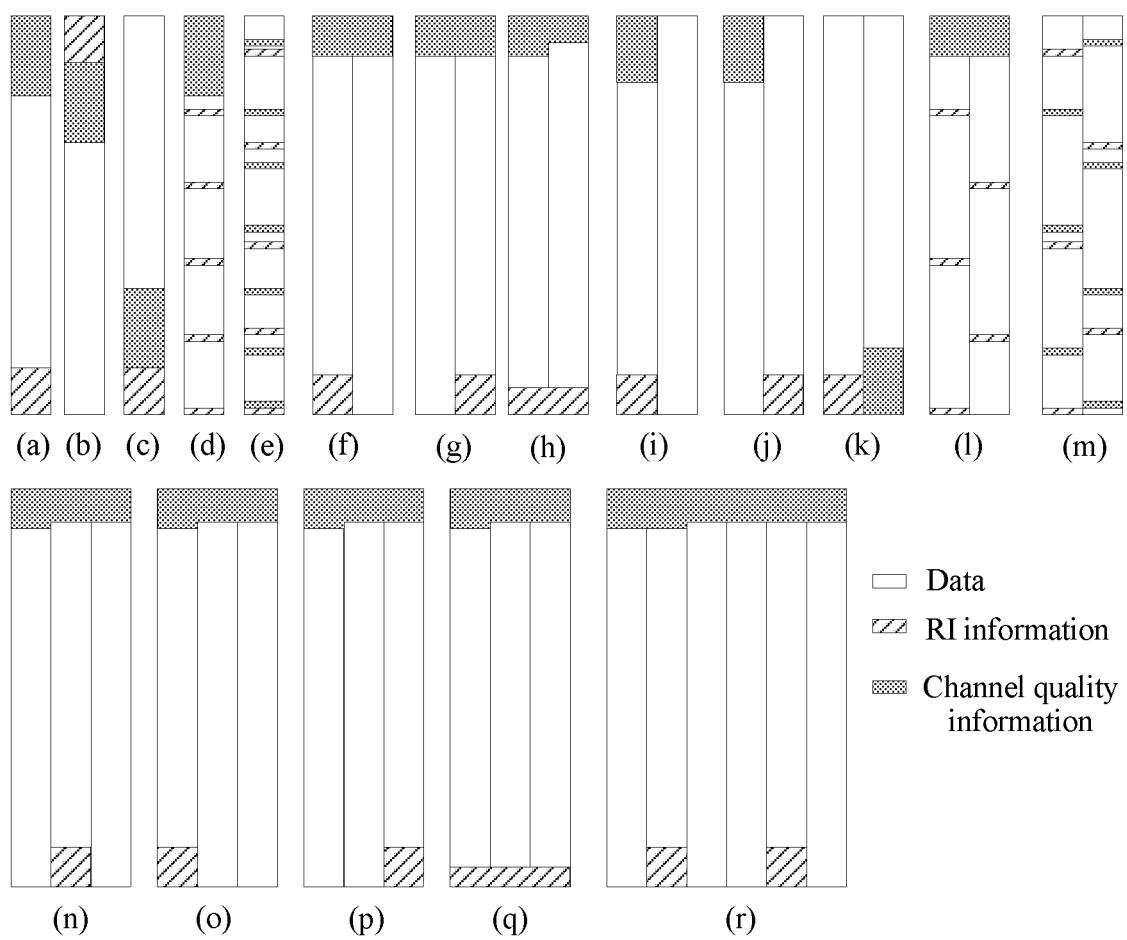
FIG. 9 is a schematic diagram of still another interleaving matrix according to an embodiment of the present disclosure.

FIG. 9 is a schematic diagram of still another interleaving matrix according to an embodiment of the present disclosure. UCI includes an RI and channel quality information. Using (a) to (r) in FIG. 9 below as an example, a method for mapping coded bits of the UCI and coded bits of data is described in detail.

Optionally, coded bits of the RI and coded bits of the channel quality information are located in one column of the interleaving matrix, for example, a $k^{th}$ column, where k is a positive integer not greater than C. For example, k=1 or C, that is, the first column or the last column, as shown in (a), (b), (c), (d), (e), and (i) in FIG. 9. Optionally, the coded bits of the RI are located in the $k^{th}$ column and in $Q_{RI}$ rows at the end of the interleaving matrix, and the coded bits of the channel quality information are located in the $k^{th}$ column and in Q rows at the top of the interleaving matrix, for example, as shown in (a) and (i) in FIG. 9. Optionally, the coded bits of the RI are located in the $k^{th}$ column and in $Q_{RI}$ rows at the top of the interleaving matrix, and the coded bits of the channel quality information are located in the $k^{th}$ column of the interleaving matrix and in Q rows below the coded bits of the RI, for example, as shown in (b) in FIG. 9. Optionally, the coded bits of the RI are located in the $k^{th}$ column and in the last $Q_{RI}$ rows of the interleaving matrix, and the coded bits of the channel quality information are located in the $k^{th}$ column of the interleaving matrix and in Q rows above the coded bits of the RI, for example, as shown in (c) in FIG. 9. Optionally, the coded bits of the channel quality information are located in the $k^{th}$ column and in Q rows at the top of the interleaving matrix, and the coded bits of the RI are located in the $k^{th}$ column of the interleaving matrix and in $Q_{RI}$ rows below the coded bits of the channel quality information. Optionally, the coded bits of the channel quality information are located in the $k^{th}$ column and in the last Q rows of the interleaving matrix, and the coded bits of the RI are located in the $k^{th}$ column of the interleaving matrix and in $Q_{RI}$ rows above the coded bits of the channel quality information.

Optionally, C is greater than 1 (for example, C=2, 4, 6, 8, 10, or 12), and the coded bits of the RI and the coded bits of the channel quality information are located in different columns of the interleaving matrix. For example, the coded bits of the RI are located in the first column, and the coded bits of the channel quality information are located in the second column, as shown in (k) in FIG. 9. For example, the coded bits of the RI are located in the second column, and the coded bits of the channel quality information are located in the first column, as shown in (j) in FIG. 9.

Optionally, C is greater than 1, the coded bits of the RI are located in the $k^{th}$ column of the interleaving matrix, and the coded bits of the channel quality information are located in at least two columns of the interleaving matrix, where k is a positive integer not greater than C. For example, k=1 or C, that is, the first column or the last column. For example, the coded bits of the RI are located in the first column or the last column of the interleaving matrix, and the coded bits of the channel quality information are located in all columns of the interleaving matrix, as shown in (f), (g), (n), (o), and (p) in FIG. 9.

Optionally, C is greater than 1, and a quantity of columns, which are occupied by the coded bits of the RI, of the interleaving matrix is less than a quantity of columns, which are occupied by the coded bits of the channel quality information, of the interleaving matrix. If C=6, as shown in (r) in FIG. 9, the coded bits of the RI are located in the second column and the fifth column of the interleaving matrix, and the coded bits of the channel quality information are located in all columns of the interleaving matrix.

Optionally, C is greater than 1, the coded bits of the RI are located in at least two columns or all columns of the interleaving matrix, and the coded bits of the channel quality information are located in at least two columns or all columns of the interleaving matrix. As shown in (q) in FIG. 9, the coded bits of the RI and the coded bits of the channel quality information are located in all columns of the interleaving matrix.

Optionally, the coded bits of the RI are continuously distributed in one column or at least two columns or all columns of the interleaving matrix, and the coded bits of the channel quality information are continuously distributed in one column or at least two columns or all columns of the interleaving matrix, as shown in (a), (b), (c), (f), (g), (h), (i), (j), (k), (n), (o), (p), (q), and (r) in FIG. 9. Optionally, the coded bits of the RI are located in one or more rows at the end of the interleaving matrix, and the coded bits of the channel quality information are located in one or more rows at the top of the interleaving matrix, as shown in (a), (f), (g), (h), (i), (j), (n), (o), (p), (q), and (r) in FIG. 9.

Optionally, the coded bits of the RI are discontinuously distributed in one column or at least two columns or all columns of the interleaving matrix, and the coded bits of the channel quality information are continuously distributed in one column or at least two columns or all columns of the interleaving matrix, as shown in (d), (l), and (m) in FIG. 9.

Optionally, the coded bits of the RI are discontinuously distributed in one column or at least two columns or all columns of the interleaving matrix, and the coded bits of the channel quality information are discontinuously distributed in one column or at least two columns or all columns of the interleaving matrix, as shown in (e) and (m) in FIG. 9.

Figure 10:
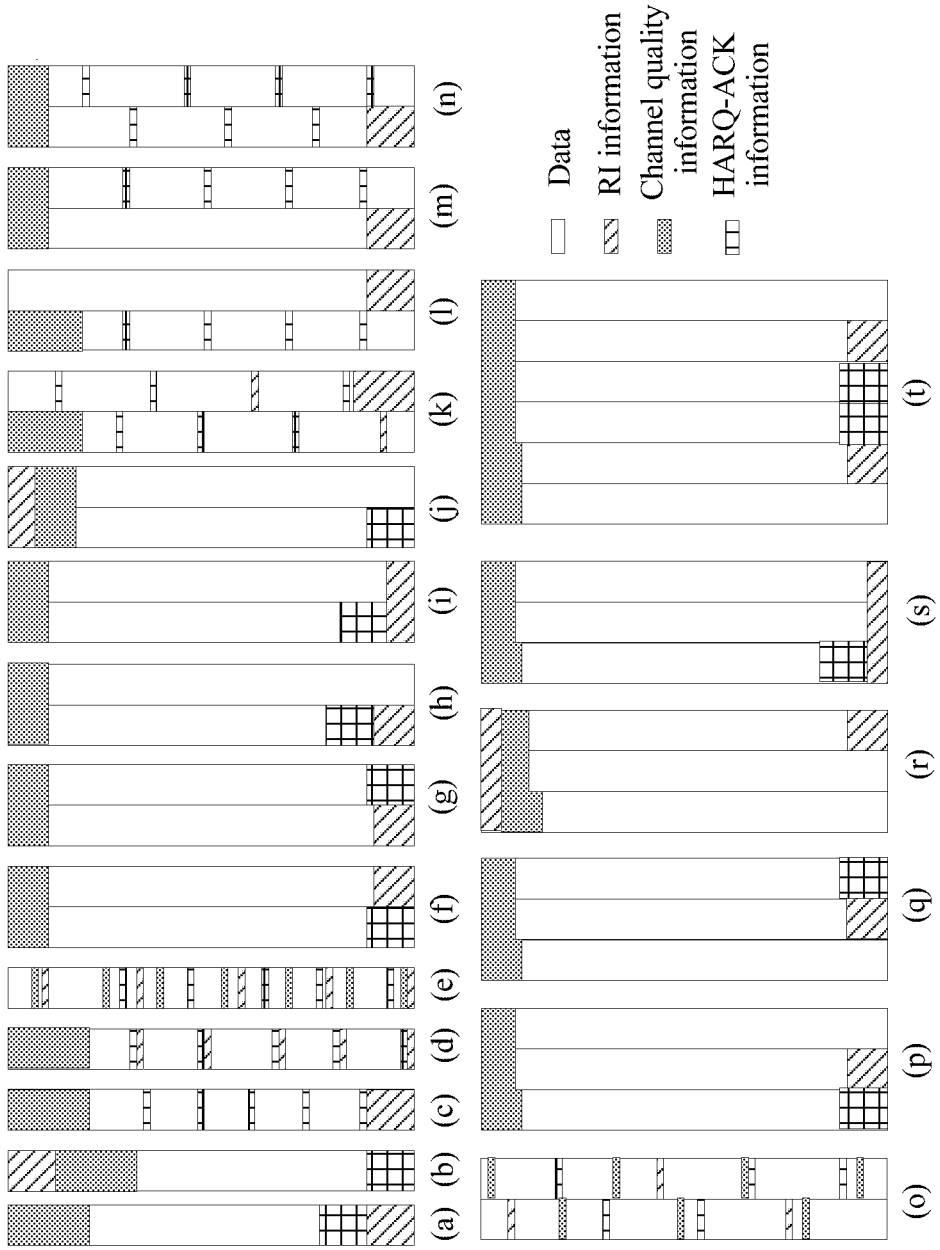
FIG. 10 is a schematic diagram of yet another interleaving matrix according to an embodiment of the present disclosure.

FIG. 10 is a schematic diagram of yet another interleaving matrix according to an embodiment of the present disclosure. UCI includes channel quality information, an RI, and HARQ-ACK information. Using (a) to (t) in FIG. 10 below as an example, a method for mapping coded bits of the UCI and coded bits of data is described in detail.

Optionally, coded bits of the RI, coded bits of the channel quality information, and coded bits of the HARQ-ACK information are located in one column of the interleaving matrix. Preferably, C=1, 2, or 3, for example, as shown in (a), (b), (c), (d), and (e) in FIG. 10. Optionally, the coded bits of the channel quality information are located in Q rows at the top of the interleaving matrix, the coded bits of the RI are located in $Q_{RI}$ rows at the end of the interleaving matrix, and the coded bits of the HARQ-ACK information are located in $Q_{ACK}$ rows above the coded bits of the RI, as shown in (a) in FIG. 10. Optionally, the coded bits of the RI are located in $Q_{RI}$ rows at the top of the interleaving matrix, the coded bits of the channel quality information are located in Q rows below the coded bits of the RI, and the coded bits of the HARQ-ACK information are located in the last $Q_{ACK}$ rows of the interleaving matrix, as shown in (b) in FIG. 10. Optionally, the coded bits of the channel quality information are located in the top Q rows of the interleaving matrix, the coded bits of the RI are located in the last $Q_{RI}$ rows of the interleaving matrix, and the coded bits of the HARQ-ACK information are discontinuously distributed in the interleaving matrix, as shown in (c) in FIG. 10.

Optionally, C is greater than 1, the coded bits of the RI and the coded bits of the HARQ-ACK information are located in different columns of the interleaving matrix, and the coded bits of the channel quality information are located in all columns of the interleaving matrix. For example, the coded bits of the HARQ-ACK information are located in the first column, and the coded bits of the RI are located in the second column, as shown in (f) and (p) in FIG. 10. For example, the coded bits of the HARQ-ACK information are located in the second column, and the coded bits of the RI are located in the first column, as shown in (g) in FIG. 10. For example, the coded bits of the HARQ-ACK information are located in the third column, and the coded bits of the RI are located in the second column, as shown in (q) in FIG. 10. For example, when C=6, as shown in (t) in FIG. 10, the coded bits of the HARQ-ACK information are located in the third column and the fourth column, and the coded bits of the RI are located in the second column and the fifth column.

Optionally, C is greater than 1, the coded bits of the RI and the coded bits of the HARQ-ACK information are located in one column of the interleaving matrix, and the coded bits of the channel quality information are located in all columns of the interleaving matrix, as shown in (h) in FIG. 10.

Optionally, C is greater than 1, the coded bits of the HARQ-ACK information are located in the $k^{th}$ column of the interleaving matrix, and the coded bits of the RI and the coded bits of the channel quality information are located in all columns of the interleaving matrix, as shown in (j), (r), and (s) in FIG. 10.

Optionally, C is greater than 1, and the coded bits of the HARQ-ACK information, the coded bits of the RI, and the coded bits of the channel quality information are located in all columns of the interleaving matrix.

Optionally, the coded bits of the HARQ-ACK information, the coded bits of the RI, and the coded bits of the channel quality information are continuously distributed in one column or at least two columns or all columns of the interleaving matrix, as shown in (a), (b), (f), (g), (h), (i), (j), (p), (q), (r), (s), and (t) in FIG. 10.

Optionally, the coded bits of the HARQ-ACK information are discontinuously distributed in one column or at least two columns or all columns of the interleaving matrix, and the coded bits of the RI and the coded bits of the channel quality information are continuously distributed in one column or at least two columns or all columns of the interleaving matrix, as shown in (c), (k), (l), (m), and (n) in FIG. 10.

Optionally, the coded bits of the HARQ-ACK information and the coded bits of the RI are discontinuously distributed in one column or at least two columns or all columns of the interleaving matrix, and the coded bits of the channel quality information are continuously distributed in one column or at least two columns or all columns of the interleaving matrix, as shown in (d) in FIG. 10.

Optionally, the coded bits of the HARQ-ACK information, the coded bits of the RI, and the coded bits of the channel quality information are discontinuously distributed in one column or at least two columns or all columns of the interleaving matrix, as shown in (e) and (o) in FIG. 10.

In the information processing method provided in this embodiment, a terminal device encodes the UCI to obtain the coded bits of the UCI and encode the data to obtain the coded bits of the data; multiplexes the coded bits of the UCI and the coded bits of the data to obtain a multiplexed bit sequence; and carries the multiplexed bit sequence on a PUSCH and sends the PUSCH to a network device, where a length of a TTI of the UCI is not greater than 0.5 ms. In this way, a data transmission latency can be effectively reduced, so that a requirement of a low latency service is met. In addition, the present disclosure provides a method for multiplexing the UCI whose TTI has a length not greater than 0.5 ms to the PUSCH, resolving a problem in the prior art that transmission of a UCI less than 1 ms cannot be supported.

Figure 11:
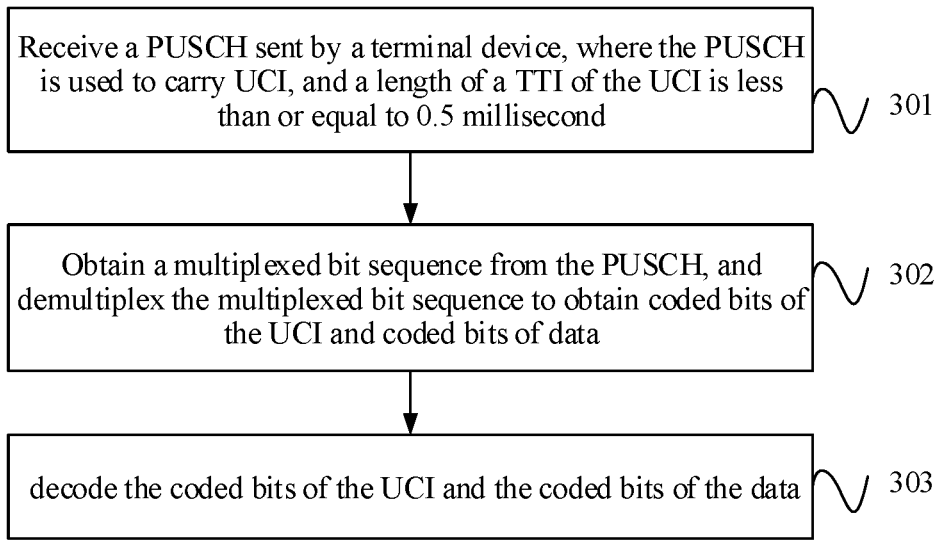
FIG. 11 is a flowchart of an information processing method according to still another embodiment of the present disclosure.

FIG. 11 is a flowchart of an information processing method according to still another embodiment of the present disclosure. The method is executed by a network device. As shown in FIG. 11, the method includes the following steps:

Step 301: Receive a PUSCH sent by a terminal device, where the PUSCH is used to carry UCI, and a length of a TTI of the UCI is less than or equal to 0.5 millisecond.

Step 302: Obtain a multiplexed bit sequence from the PUSCH, and demultiplex the multiplexed bit sequence to obtain coded bits of the UCI and coded bits of data.

Step 303: decode the coded bits of the UCI and the coded bits of the data.

The information processing method provided in this embodiment corresponds to the information processing method provided in the embodiment shown in FIG. 3, and has an implementation principle similar to that of the embodiment shown in FIG. 3. This method may be used as an independent embodiment, or may be used together with the foregoing method. Unless otherwise specified, for content, which is the same as content of the foregoing embodiments, of this embodiment, refer to the descriptions in the foregoing embodiments, and details are not subsequently described again.

Optionally, the UCI includes at least one of channel quality information, hybrid automatic repeat request-acknowledgment HARQ-ACK information, and a RI.

Optionally, the UCI includes a plurality of pieces of HARQ-ACK information, and the plurality of pieces of HARQ-ACK information respectively indicate receiving statuses of a plurality of pieces of downlink data. TTIs of at least two of the plurality of pieces of downlink data have different lengths, and TTIs of the plurality of pieces of HARQ-ACK information have a same length. Optionally, before step 301, the method further includes: The network device sends signaling to the terminal device, where the signaling includes information used to indicate lengths of TTIs of one or more pieces of HARQ-ACK information. For specific content, refer to the foregoing descriptions, and details are not described herein again.

A total quantity of bits of the multiplexed bit sequence may be determined based on the mechanism 1 or the mechanism 2, and details are not described herein again. Based on the mechanism 2, before step 301, the network device may further send a UL grant to the terminal device. For specific content of the UL grant, refer to the foregoing descriptions, and details are not described herein again.

Optionally, the network device may further send control signaling to the terminal device. The control signaling is higher layer signaling or physical layer signaling, and is used to instruct the terminal device to use the mechanism 1 or the mechanism 2.

Optionally, the PUSCH occupies one symbol in time domain. For locations of various pieces of UCI in the multiplexed bit sequence, refer to the foregoing descriptions, and details are not described herein again.

Figure 12:
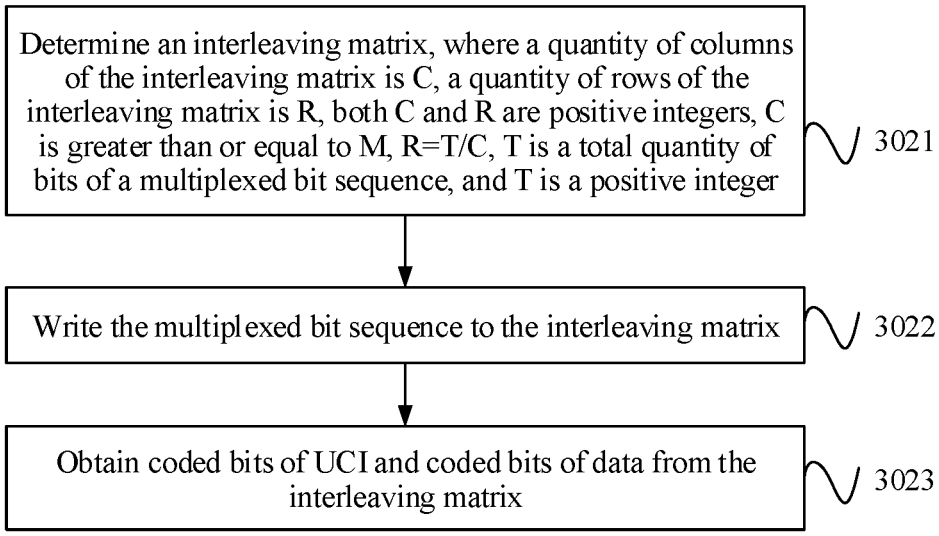
FIG. 12 is a flowchart of an information processing method according to yet another embodiment of the present disclosure.

In this embodiment, the PUSCH occupies M symbols in time domain, and M is a positive integer not greater than 7. FIG. 12 is a flowchart of an information processing method according to yet another embodiment of the present disclosure. As shown in FIG. 12, an implementation of the "demultiplexing the multiplexed bit sequence to obtain coded bits of the UCI and coded bits of data" in step 302 includes the following steps:

Step 3021: Determine an interleaving matrix, where a quantity of columns of the interleaving matrix is C, a quantity of rows of the interleaving matrix is R, both C and R are positive integers, C is greater than or equal to M, R=T/C, T is a total quantity of bits of the multiplexed bit sequence, and T is a positive integer.

Step 3022: Write the multiplexed bit sequence to the interleaving matrix.

Preferably, the network device writes the multiplexed bit sequence to the interleaving matrix column by column (column by column).

Step 3023: obtain the coded bits of the UCI and the coded bits of the data from the interleaving matrix.

Step 3023 may specifically include at least one of the following steps: obtaining the RI from the interleaving matrix; obtaining coded bits of the HARQ-ACK information from the interleaving matrix; and reading the coded bits of the data and/or coded bits of the channel quality information row by row (row by row or rows by rows). In this way, step 3022 and step 3023 are combined for use. That is, the coded bits of the data and/or the coded bits of the channel quality information are written column by column and read row by row, and this implements a de-interleaving function.

After the network device performs step 3022, that is, the network device writes the multiplexed bit sequence to the interleaving matrix, for locations of the coded bits of the UCI in the interleaving matrix, refer to the descriptions in the embodiment on a side of the terminal device, and details are not described herein again.

In the information processing method provided in this embodiment, the network device receives the PUSCH that is sent by the terminal device and that carries the UCI, obtains the multiplexed bit sequence from the PUSCH, demultiplexes the multiplexed bit sequence to obtain the coded bits of the UCI and the coded bits of the data, and decodes the coded bits of the UCI to obtain original UCI and decodes the coded bits of the data to obtain original data, where the length of the TTI of the UCI is not greater than 0.5 ms. In this way, a data transmission latency can be effectively reduced, so that a requirement of a low latency service is met. In addition, the present disclosure provides a method for obtaining the UCI whose TTI has a length not greater than 0.5 ms from the PUSCH, resolving a problem in the prior art that transmission of a UCI less than 1 ms cannot be supported.

Figure 13:
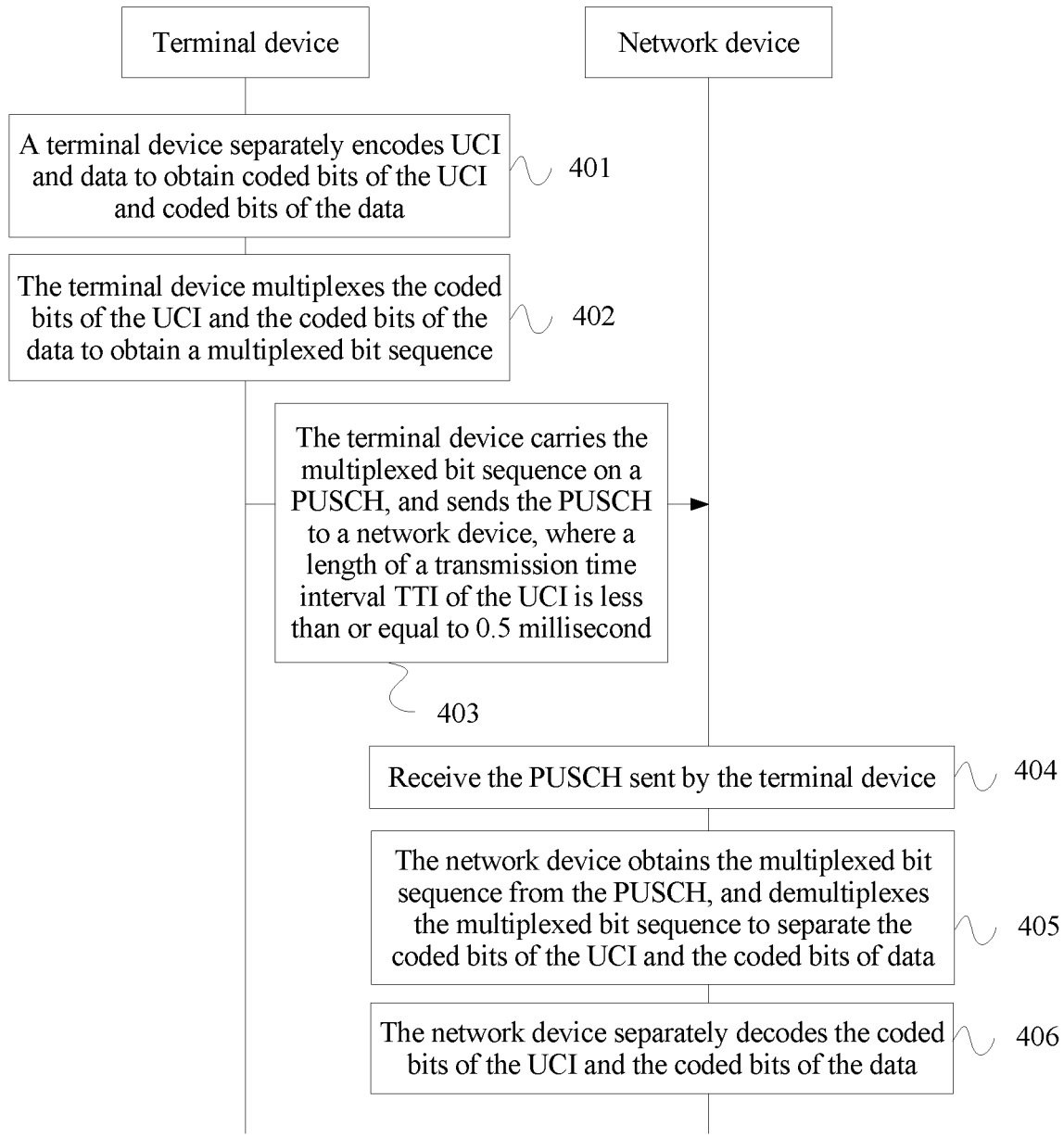
FIG. 13 is an interaction flowchart of an information processing method according to an embodiment of the present disclosure.

FIG. 13 is an interaction flowchart of an information processing method according to an embodiment of the present disclosure. As shown in FIG. 13, the method includes the following steps:

Step 401: A terminal device encodes UCI to obtain coded bits of the UCI and encodes data to obtain coded bits of the data.

Step 402: The terminal device multiplexes the coded bits of the UCI and the coded bits of the data to obtain a multiplexed bit sequence.

Step 403: The terminal device carries the multiplexed bit sequence on a PUSCH, and sends the PUSCH to a network device, where a length of a transmission time interval TTI of the UCI is less than or equal to 0.5 millisecond.

Step 404: Receive the PUSCH sent by the terminal device.

Step 405: The network device obtains the multiplexed bit sequence from the received PUSCH, and demultiplexes the multiplexed bit sequence to obtain the coded bits of the UCI and the coded bits of data.

Step 406: The network device decodes the coded bits of the UCI and decodes the coded bits of the data.

The information processing method provided in this embodiment is an embodiment in which the terminal device exchanges information with the network device. For an implementation principle of the information processing method, refer to the embodiments shown in FIG. 3 and FIG. 11. In addition, the information processing methods provided in the foregoing embodiments are also suitable for this embodiment, and details are not described herein again.

In the information processing method provided in this embodiment, the terminal device encodes the UCI to obtain the coded bits of the UCI and encodes the data to obtain the coded bits of the data; multiplexes the coded bits of the UCI and the coded bits of the data to obtain the multiplexed bit sequence; and then carries the multiplexed bit sequence on the PUSCH and sends the PUSCH to the network device. The network device obtains the multiplexed bit sequence from the received PUSCH; demultiplexes the multiplexed bit sequence to obtain the coded bits of the UCI and the coded bits of the data; decodes the coded bits of the UCI to obtain original UCI and decodes the coded bits of the data to obtain original data, where the length of the TTI of the UCI is not greater than 0.5 ms. In this way, a data transmission latency can be effectively reduced, so that a requirement of a low latency service is met.

Figure 14:
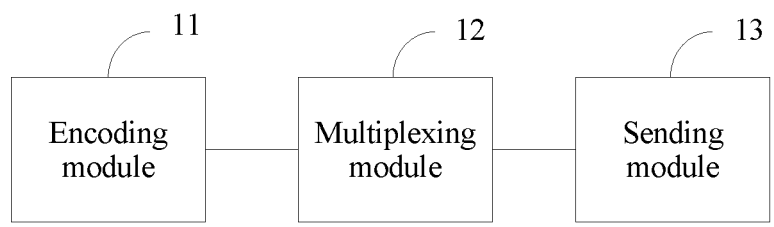
FIG. 14 is a schematic structural diagram of a terminal device according to an embodiment of the present disclosure.

FIG. 14 is a schematic structural diagram of a terminal device according to an embodiment of the present disclosure. As shown in FIG. 14, the terminal device includes an encoding module 11, a multiplexing module 12, and a sending module 13. The encoding module 11 is configured to encode uplink control information UCI to obtain coded bits of the UCI and encode data to obtain coded bits of the data. The multiplexing module 12 is configured to multiplex the coded bits of the UCI and the coded bits of the data to obtain a multiplexed bit sequence. The sending module 13 is configured to: carry the multiplexed bit sequence on a PUSCH, and send the PUSCH to a network device, where a length of a transmission time interval TTI of the UCI is less than or equal to 0.5 millisecond.

In this embodiment, the length of the TTI of the UCI is less than or equal to 0.5 ms. For example, the length of the TTI of the UCI is one symbol, two symbols, three symbols, four symbols, or 0.5 ms. Optionally, a length of a TTI of the PUSCH is equal to or greater than the length of the TTI of the UCI. For example, the length of the TTI of the PUSCH is one symbol, two symbols, three symbols, four symbols, 0.5 ms, or 1 ms. In the prior art, the length of the TTI of the UCI is 1 ms, and the UCI is carried on a PUSCH whose TTI has a length of 1 ms.

In this embodiment, the coded bits of the UCI are bits obtained by encoding original bits of the UCI. When the UCI is carried on the PUSCH, UCI of different types is independently encoded. For example, the terminal device encodes the UCI of different types according to Section 5.2.2.6 in TS36.212. It should be noted that, when both an RI and a CRI appear, joint channel coding is performed on the RI and the CRI.

The coded bits of the data are bits obtained by encoding original bits of the data. Data coding mainly includes operations, such as a cyclic redundancy check (CRC) attachment, channel coding, and rate matching. For example, according to descriptions of Section 5.2.2.1 to Section 5.2.2.5 in TS36.212, the data coding includes a transport block CRC attachment, code block segmentation, a code block CRC attachment, channel coding, rate matching, and code block concatenation.

The terminal device in this embodiment may be used to perform the technical solution of the embodiment of the method shown in FIG. 3. Implementation principles and technical effects thereof are similar, and are not described herein again.

Optionally, the UCI includes at least one of channel quality information, hybrid automatic repeat request-acknowledgment HARQ-ACK information, and a RI.

Optionally, based on the embodiment shown in FIG. 14, a total quantity (which is denoted as T) of bits of the multiplexed bit sequence may be obtained by using two different mechanisms: a mechanism 1 or a mechanism 2. Specifically:

Mechanism 1

The total quantity of the bits of the multiplexed bit sequence is a sum of a quantity of the coded bits of the data and a quantity of coded bits of the channel quality information; or the total quantity of the bits of the multiplexed bit sequence is a sum of a quantity of the coded bits of the data and a quantity of coded bits of the RI; or the total quantity of the bits of the multiplexed bit sequence is a sum of a quantity of the coded bits of the data, a quantity of coded bits of the channel quality information, and a quantity of coded bits of the RI.

In the mechanism 1, the terminal device performs rate matching on the data based on the quantity of the coded bits of the RI and/or the quantity of the coded bits of the channel quality information, and/or the terminal device punctures the data based on a quantity of coded bits of the HARQ-ACK information. In the mechanism, the total quantity T of the bits is related to the quantity of the coded bits of the data, the quantity of the coded bits of the channel quality information, and/or the quantity of the coded bits of the RI.

Mechanism 2

The total quantity of the bits of the multiplexed bit sequence is a sum of a quantity of the coded bits of the data and a quantity of the coded bits of the UCI.

In the mechanism 2, the terminal device performs rate matching on the data based on a quantity of coded bits of the HARQ-ACK information and/or a quantity of coded bits of the RI and/or a quantity of coded bits of the channel quality information. In the mechanism, the total quantity T of the bits is related to the quantity of the coded bits of the data, the quantity of the coded bits of the HARQ-ACK information, the quantity of the coded bits of the channel quality information, and the quantity of the coded bits of the RI.

In this embodiment, implementation principles of the mechanism 1 and the mechanism 2 are the same as implementation principles of the mechanism 1 and the mechanism 2 in the embodiment shown in FIG. 3, and are not described herein again.

Optionally, the terminal device may further include a receiving module, configured to receive control signaling sent by the network device. The control signaling is higher layer signaling or physical layer signaling, and is used to instruct the terminal device to use the mechanism 1 or the mechanism 2.

Optionally, the PUSCH occupies one symbol in time domain; the UCI includes the channel quality information; in the multiplexed bit sequence, coded bits of the channel quality information are located before the coded bits of the data.

Optionally, the PUSCH occupies one symbol in time domain; the UCI includes the RI; in the multiplexed bit sequence, coded bits of the RI are located after the coded bits of the data.

Optionally, the PUSCH occupies one symbol in time domain; the UCI includes the HARQ-ACK information; in the multiplexed bit sequence, the HARQ-ACK information is located after the coded bits of the data.

Optionally, the PUSCH occupies one symbol in time domain; the UCI includes the HARQ-ACK information and the RI; in the multiplexed bit sequence, the HARQ-ACK information is located before coded bits of the RI.

How to multiplex UCI of different types when the PUSCH occupies one symbol in time domain is mainly discussed in this embodiment. If the PUSCH occupies one symbol in time domain, the length of the TTI of the PUSCH is one symbol or two symbols. It should be noted that, even if the length of the TTI of the PUSCH is two symbols, the data carried on the PUSCH is located on only one symbol, and a DMRS occupies the other symbol, that is, the first TTI in FIG. 2(a). Optionally, in a bit sequence $h_0, h_1, h_2, \ldots, h_{T-1}$, the coded bits of the channel quality information are located before the coded bits of the data. That is, the terminal device concatenates the coded bits of the channel quality information before the coded bits of the data. Optionally, in the bit sequence $h_0, h_1, h_2, \ldots, h_{T-1}$, the coded bits of the RI are located after the coded bits of the data. That is, the terminal device concatenates the coded bits of the RI after the coded bits of the data. Optionally, in the bit sequence $h_0, h_1, h_2, \ldots, h_{T-1}$, the coded bits of the HARQ-ACK information are located after the coded bits of the data or the coded bits of the channel quality information, and/or are located before the coded bits of the RI. Optionally, the terminal device concatenates the coded bits of the HARQ-ACK information after the coded bits of the data and/or before the coded bits of the RI. Optionally, the terminal device overwrites the coded bits of the HARQ-ACK information to some coded bits of the data and/or some encoding of the channel quality information from back to front. Optionally, the coded bits of the HARQ-ACK information are discontinuously located in the bit sequence $h_0, h_1, h_2, \ldots, h_{T-1}$. Optionally, the terminal device discontinuously overwrites the coded bits of the HARQ-ACK information to some coded bits of the data and/or some coded bits of the channel quality information.

Further, the PUSCH occupies M symbols in time domain, and M is a positive integer not greater than 7. The multiplexing module 12 is specifically configured to: determine an interleaving matrix, and map the coded bits of the UCI and the coded bits of the data to the interleaving matrix; and read the multiplexed bit sequence from the interleaving matrix, where a quantity of columns of the interleaving matrix is C, a quantity of rows of the interleaving matrix is R, both C and R are positive integers, C is greater than or equal to M, R=T/C, T is a total quantity of bits of the multiplexed bit sequence, and T is a positive integer.

Optionally, C=M. In this case, the terminal device may determine the interleaving matrix based on the total quantity T of the bits of the multiplexed bit sequence and the quantity M of symbols occupied by the PUSCH in time domain. For example, if the quantity M of symbols occupied by the PUSCH in time domain is equal to 3, the total quantity T of the bits of the multiplexed bit sequence is equal to 12, and C=3, R=4.

Optionally, C>M. In this case, the terminal device determines the interleaving matrix based on the total quantity T of the bits of the multiplexed bit sequence. For example, if the quantity M of symbols occupied by the PUSCH in time domain is equal to 3, the total quantity T of the bits of the multiplexed bit sequence is equal to 12, and C=4, R=3.

Preferably, the terminal device reads the multiplexed bit sequence from the interleaving matrix column by column.

The terminal device in this embodiment may be used to perform the technical solution of the embodiment of the method shown in FIG. 4. Implementation principles and technical effects thereof are similar, and are not described herein again.

Optionally, as shown in FIG. 6, the UCI includes the HARQ-ACK information; and C=1, 2, or 3, and the coded bits of the HARQ-ACK information are located in a $k^{th}$ column of the interleaving matrix, where k is a positive integer not greater than C, for example, as shown in (a), (c), or (i) in FIG. 6; or C=6, and the coded bits of the HARQ-ACK information are located in the third column and the fourth column of the interleaving matrix, for example, as shown in (m) in FIG. 6; or C=12, and the coded bits of the HARQ-ACK information are located in the third column, the fourth column, the ninth column, and the tenth column of the interleaving matrix.

Optionally, as shown in FIG. 7, the UCI includes the RI; and C=2 or 3, and the coded bits of the RI are located in the second column of the interleaving matrix; or C=6, and the coded bits of the RI are located in the second column and the fifth column of the interleaving matrix; or C=12, and the coded bits of the RI are located in the second column, the fifth column, the eighth column, and the eleventh column of the interleaving matrix.

Optionally, the UCI includes the channel quality information, and the coded bits of the channel quality information are located in at least one row at the top of all columns of the interleaving matrix.

Optionally, the UCI includes the RI and the HARQ-ACK information; as shown in (a), (e), or (m) in the figure, C=1, 2, or 3, the coded bits of the RI are located in at least one row at the end of a $k^{th}$ column of the interleaving matrix, and the coded bits of the HARQ-ACK information are located in the $k^{th}$ column of the interleaving matrix and are located in at least one row above the coded bits of the RI, where k is a positive integer not greater than C; or C is greater than 1, and the coded bits of the RI information and the coded bits of the HARQ-ACK information are located in different columns of the interleaving matrix.

Optionally, the UCI includes the channel quality information, the RI, and the HARQ-ACK information, and C is greater than 1; and the coded bits of the RI and the coded bits of the HARQ-ACK information are located in different columns of the interleaving matrix, and the coded bits of the channel quality information are located in all columns of the interleaving matrix.

For an implementation of the terminal device provided in this embodiment, refer to the implementations of the embodiments shown in FIG. 6 to FIG. 10 specifically, and details are not described herein again.

Figure 15:
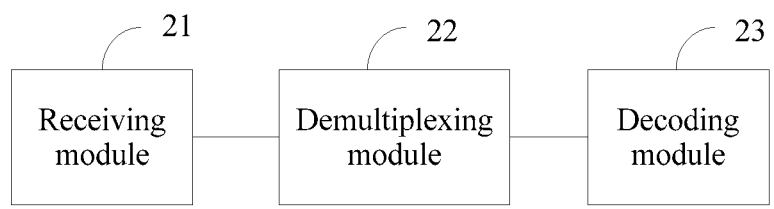
FIG. 15 is a schematic structural diagram of a network device according to an embodiment of the present disclosure.

FIG. 15 is a schematic structural diagram of a network device according to an embodiment of the present disclosure. As shown in FIG. 15, the network device includes a receiving module 21, a demultiplexing module 22, and a decoding module 23. The receiving module 21 is configured to receive a physical uplink shared channel PUSCH sent by a terminal device, where the PUSCH is used to carry uplink control information UCI, and a length of a transmission time interval TTI of the UCI is less than or equal to 0.5 millisecond. The demultiplexing module 22 is configured to: obtain a multiplexed bit sequence from the PUSCH, and demultiplex the multiplexed bit sequence to obtain coded bits of the UCI and coded bits of data. The decoding module 23 is configured to decode the coded bits of the UCI and the coded bits of the data.

The network device provided in this embodiment may be used to perform the technical solution of the method embodiment shown in FIG. 11. Implementation principles and technical effects thereof are similar, and are not described herein again.

Optionally, a total quantity of bits of the multiplexed bit sequence is a sum of a quantity of the coded bits of the data and a quantity of the coded bits of the UCI.

Optionally, the UCI includes at least one of channel quality information, hybrid automatic repeat request-acknowledgment HARQ-ACK information, and a RI.

Optionally, a total quantity of bits of the multiplexed bit sequence is a sum of a quantity of the coded bits of the data and a quantity of coded bits of channel quality information; or a total quantity of bits of the multiplexed bit sequence is a sum of a quantity of the coded bits of the data and a quantity of coded bits of the RI; or a total quantity of bits of the multiplexed bit sequence is a sum of a quantity of the coded bits of the data, a quantity of coded bits of the channel quality information, and a quantity of coded bits of the RI.

Optionally, the PUSCH occupies one symbol in time domain; the UCI includes the channel quality information; in the multiplexed bit sequence, coded bits of the channel quality information are located before the coded bits of the data.

Optionally, the PUSCH occupies one symbol in time domain; the UCI includes the RI; in the multiplexed bit sequence, coded bits of the RI are located after the coded bits of the data.

Optionally, the PUSCH occupies one symbol in time domain; the UCI includes the HARQ-ACK information; in the multiplexed bit sequence, the HARQ-ACK information is located after the coded bits of the data.

Optionally, the PUSCH occupies one symbol in time domain; the UCI includes the HARQ-ACK information and the RI; in the multiplexed bit sequence, the HARQ-ACK information is located before coded bits of the RI.

Optionally, the PUSCH occupies one symbol in time domain. For locations of various pieces of UCI in the multiplexed bit sequence, refer to the foregoing descriptions, and details are not described herein again.

Optionally, the PUSCH occupies M symbols in time domain, and M is a positive integer not greater than 7; and the demultiplexing module is specifically configured to: determine an interleaving matrix, and write the multiplexed bit sequence to the interleaving matrix; and obtain the coded bits of the UCI and the coded bits of the data from the interleaving matrix, where a quantity of columns of the interleaving matrix is C, a quantity of rows of the interleaving matrix is R, both C and R are positive integers, C is greater than or equal to M, R=T/C, T is a total quantity of bits of the multiplexed bit sequence, and T is a positive integer.

The network device in this embodiment may be used to perform the technical solution of the method embodiment shown in FIG. 12. Implementation principles and technical effects thereof are similar, and are not described herein again.

Optionally, the UCI includes the HARQ-ACK information, and after the multiplexed bit sequence is written to the interleaving matrix, C=1, 2, or 3, and coded bits of the HARQ-ACK information are located in a $k^{th}$ column of the interleaving matrix, where k is a positive integer not greater than C; or C=6, and coded bits of the HARQ-ACK information are located in the third column and the fourth column of the interleaving matrix; or C=12, and coded bits of the HARQ-ACK information are located in the third column, the fourth column, the ninth column, and the tenth column of the interleaving matrix.

Optionally, the UCI includes the RI, and after the multiplexed bit sequence is written to the interleaving matrix, C=2 or 3, and coded bits of the RI are located in the second column of the interleaving matrix; or C=6, and coded bits of the RI are located in the second column and the fifth column of the interleaving matrix; or C=12, and coded bits of the RI are located in the second column, the fifth column, the eighth column, and the eleventh column of the interleaving matrix.

Optionally, the UCI includes the channel quality information, and after the multiplexed bit sequence is written to the interleaving matrix, the coded bits of the channel quality information are located in at least one row at the top of all columns of the interleaving matrix.

Optionally, the UCI includes the RI and the HARQ-ACK information, and after the multiplexed bit sequence is written to the interleaving matrix, C=1, 2, or 3, the coded bits of the RI are located in at least one row at the end of the $k^{th}$ column of the interleaving matrix, and the coded bits of the HARQ-ACK information are located in the $k^{th}$ column of the interleaving matrix and are located in at least one row above the coded bits of the RI, where k is a positive integer not greater than C; or C is greater than 1, and the coded bits of the RI information and the coded bits of the HARQ-ACK information are located in different columns of the interleaving matrix.

Optionally, the UCI includes the channel quality information, the RI, and the HARQ-ACK information, and C is greater than 1; and after the multiplexed bit sequence is written to the interleaving matrix, the coded bits of the RI and the coded bits of the HARQ-ACK information are located in different columns of the interleaving matrix, and the coded bits of the channel quality information are located in all columns of the interleaving matrix.

In this embodiment, for locations of the UCI in the multiplexed bit sequence, refer to the descriptions in FIG. 6 to FIG. 10, and details are not described herein again.

Figure 16:
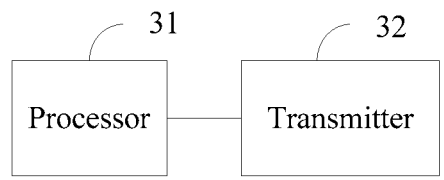
FIG. 16 is a schematic structural diagram of a terminal device according to an embodiment of the present disclosure.

FIG. 16 is a schematic structural diagram of a terminal device according to an embodiment of the present disclosure. As shown in FIG. 16, the terminal device includes a processor 31 and a transmitter 32. The processor 31 is configured to: encode uplink control information UCI to obtain coded bits of the UCI and encode data to obtain coded bits of the data; and multiplex the coded bits of the UCI and the coded bits of the data to obtain a multiplexed bit sequence. The transmitter 32 is configured to: carry the multiplexed bit sequence on a physical uplink shared channel PUSCH, and send the PUSCH to the network device, where a length of a transmission time interval TTI of the UCI is less than or equal to 0.5 millisecond.

The terminal device provided in this embodiment may be used to perform the technical solution of the method embodiment shown in FIG. 3. Implementation principles and technical effects thereof are similar, and are not described herein again.

The processor 31 may be a general purpose processor, and includes a central processing unit (CPU), a network processor (NP), or the like; or may be a digital signal processor (DSP), an application-specific integrated circuit (ASIC), a field programmable gate array (FPGA) or another programmable logic device, a discrete gate or a transistor logic device, or a discrete hardware component.

Optionally, the terminal device may further include a receiver and a memory. The receiver is coupled to the processor, and the memory is coupled to the processor. The receiver is configured to receive data, a message, and the like that are sent by the network device or another device. The memory is configured to store an operating system, program code, and data. The memory may include a random access memory (RAM), and may further include a non-volatile memory, for example, at least one magnetic disk storage.

Optionally, a total quantity of bits of the multiplexed bit sequence is a sum of a quantity of the coded bits of the data and a quantity of the coded bits of the UCI.

Optionally, the UCI includes at least one of channel quality information, hybrid automatic repeat request-acknowledgment HARQ-ACK information, and a RI.

Optionally, a total quantity of bits of the multiplexed bit sequence is a sum of a quantity of the coded bits of the data and a quantity of coded bits of the channel quality information; or a total quantity of bits of the multiplexed bit sequence is a sum of a quantity of the coded bits of the data and a quantity of coded bits of the RI; or a total quantity of bits of the multiplexed bit sequence is a sum of quantity of the coded bits of the data, a quantity of coded bits of the channel quality information, and a quantity of coded bits of the RI.

Optionally, the PUSCH occupies one symbol in time domain; the UCI includes the channel quality information; in the multiplexed bit sequence, coded bits of the channel quality information are located before the coded bits of the data.

Optionally, the PUSCH occupies one symbol in time domain; the UCI includes the RI; in the multiplexed bit sequence, coded bits of the RI are located after the coded bits of the data.

Optionally, the PUSCH occupies one symbol in time domain; the UCI includes the HARQ-ACK information; in the multiplexed bit sequence, the HARQ-ACK information is located after the coded bits of the data.

Optionally, the PUSCH occupies one symbol in time domain; the UCI includes the HARQ-ACK information and the RI; in the multiplexed bit sequence, the HARQ-ACK information is located before coded bits of the RI.

Optionally, the PUSCH occupies M symbols in time domain, and M is a positive integer not greater than 7; and that the processor 31 multiplexes the coded bits of the UCI and the coded bits of the data to obtain the multiplexed bit sequence includes: The processor 31 determines an interleaving matrix, and maps the coded bits of the UCI and the coded bits of the data to the interleaving matrix; and reads the multiplexed bit sequence from the interleaving matrix, where a quantity of columns of the interleaving matrix is C, a quantity of rows of the interleaving matrix is R, both C and R are positive integers, C is greater than or equal to M, R=T/C, T is a total quantity of bits of the multiplexed bit sequence, and T is a positive integer.

Optionally, the UCI includes the HARQ-ACK information; and C=1, 2, or 3, and coded bits of the HARQ-ACK information are located in a $k^{th}$ column of the interleaving matrix, where k is a positive integer not greater than C; or C=6, and coded bits of the HARQ-ACK information are located in the third column and the fourth column of the interleaving matrix; or C=12, and coded bits of the HARQ-ACK information are located in the third column, the fourth column, the ninth column, and the tenth column of the interleaving matrix.

Optionally, the UCI includes the RI; and C=2 or 3, and coded bits of the RI are located in the second column of the interleaving matrix; or C=6, and coded bits of the RI are located in the second column and the fifth column of the interleaving matrix; or C=12, and coded bits of the RI are located in the second column, the fifth column, the eighth column, and the eleventh column of the interleaving matrix.

Optionally, the UCI includes the channel quality information, and coded bits of the channel quality information are located in at least one row at the top of all columns of the interleaving matrix.

Optionally, the UCI includes the RI and the HARQ-ACK information; C=1, 2, or 3, the coded bits of the RI are located in at least one row at the end of a $k^{th}$ column of the interleaving matrix, and the coded bits of the HARQ-ACK information are located in the $k^{th}$ column of the interleaving matrix and are located in at least one row above the coded bits of the RI, where k is a positive integer not greater than C; or C is greater than 1, and the coded bits of the RI information and the coded bits of the HARQ-ACK information are located in different columns of the interleaving matrix.

Optionally, the UCI includes the channel quality information, the RI, and the HARQ-ACK information, and C is greater than 1; the coded bits of the RI and the coded bits of the HARQ-ACK information are located in different columns of the interleaving matrix, and the coded bits of the channel quality information are located in all columns of the interleaving matrix.

An implementation principle and beneficial effects of the network device provided in this embodiment are similar to the implementation principle and the beneficial effects of the method embodiments shown in FIG. 3 to FIG. 5. For distribution of the UCI in the multiplexed bit sequence, refer to the descriptions in FIG. 6 to FIG. 10 specifically, and details are not described herein again.

Figure 17:
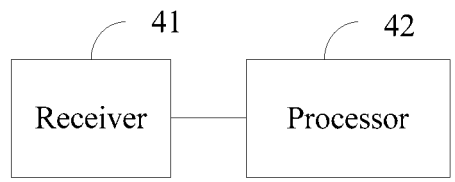
FIG. 17 is a schematic structural diagram of a network device according to an embodiment of the present disclosure.

FIG. 17 is a schematic structural diagram of a network device according to an embodiment of the present disclosure. As shown in FIG. 17, the network device includes a receiver 41 and a processor 42. The receiver 41 is configured to receive a physical uplink shared channel PUSCH sent by a terminal device, where the PUSCH is used to carry uplink control information UCI, and a length of a transmission time interval TTI of the UCI is less than or equal to 0.5 millisecond. The processor 42 is configured to: obtain a multiplexed bit sequence from the PUSCH, and demultiplex the multiplexed bit sequence to obtain coded bits of the UCI and coded bits of data; and decode the coded bits of the UCI and the coded bits of the data.

The network device in this embodiment may be used to perform the technical solution of the method embodiment shown in FIG. 11. Implementation principles and technical effects thereof are similar, and are not described herein again.

The processor 42 may be a general purpose processor, and includes a central processing unit (CPU), a network processor (NP), or the like; or may be a digital signal processor (DSP), an application-specific integrated circuit (ASIC), a field programmable gate array (FPGA) or another programmable logic device, a discrete gate or a transistor logic device, or a discrete hardware component.

Optionally, the network device may further include a transmitter and a memory. The transmitter is coupled to the processor, and the memory is coupled to the processor. The transmitter is configured to send data, a message, and the like to the terminal device or another device. The memory is configured to store an operating system, program code, and data. The memory may include a random access memory (RAM), and may include a non-volatile memory, for example, at least one magnetic disk storage.

Optionally, a total quantity of bits of the multiplexed bit sequence is a sum of a quantity of the coded bits of the data and a quantity of the coded bits of the UCI.

Optionally, the UCI includes at least one of channel quality information, hybrid automatic repeat request-acknowledgment HARQ-ACK information, and a RI.

Optionally, a total quantity of bits of the multiplexed bit sequence is a sum of a quantity of the coded bits of the data and a quantity of coded bits of the channel quality information; or a total quantity of bits of the multiplexed bit sequence is a sum of a quantity of the coded bits of the data and a quantity of coded bits of the RI; or a total quantity of bits of the multiplexed bit sequence is a sum of a quantity of the coded bits of the data, a quantity of coded bits of the channel quality information, and a quantity of coded bits of the RI.

Optionally, the PUSCH occupies one symbol in time domain; the UCI includes the channel quality information; in the multiplexed bit sequence, coded bits of the channel quality information are located before the coded bits of the data.

Optionally, the PUSCH occupies one symbol in time domain; the UCI includes the RI; in the multiplexed bit sequence, coded bits of the RI are located after the coded bits of the data.

Optionally, the PUSCH occupies one symbol in time domain; the UCI includes the HARQ-ACK information; in the multiplexed bit sequence, the HARQ-ACK information is located after the coded bits of the data.

Optionally, the PUSCH occupies one symbol in time domain; the UCI includes the HARQ-ACK information and the RI; in the multiplexed bit sequence, the HARQ-ACK information is located before coded bits of the RI.

Optionally, the PUSCH occupies M symbols in time domain, and M is a positive integer not greater than 7; and that the processor 42 demultiplexes the multiplexed bit sequence to obtain the coded bits of the UCI and the coded bits of data includes: The processor 42 determines an interleaving matrix, and writes the multiplexed bit sequence to the interleaving matrix; and obtains the coded bits of the UCI and the coded bits of the data from the interleaving matrix, where a quantity of columns of the interleaving matrix is C, a quantity of rows of the interleaving matrix is R, both C and R are positive integers, C is greater than or equal to M, R=T/C, T is a total quantity of bits of the multiplexed bit sequence, and T is a positive integer.

Optionally, the UCI includes the HARQ-ACK information, and after the multiplexed bit sequence is written to the interleaving matrix, C=1, 2, or 3, and coded bits of the HARQ-ACK information are located in a $k^{th}$ column of the interleaving matrix, where k is a positive integer not greater than C; or C=6, and coded bits of the HARQ-ACK information are located in the third column and the fourth column of the interleaving matrix; or C=12, and coded bits of the HARQ-ACK information are located in the third column, the fourth column, the ninth column, and the tenth column of the interleaving matrix.

Optionally, the UCI includes the RI, and after the multiplexed bit sequence is written to the interleaving matrix, C=2 or 3, and coded bits of the RI are located in the second column of the interleaving matrix; or C=6, and coded bits of the RI are located in the second column and the fifth column of the interleaving matrix; or C=12, and coded bits of the RI are located in the second column, the fifth column, the eighth column, and the eleventh column of the interleaving matrix.

Optionally, the UCI includes the channel quality information, and after the multiplexed bit sequence is written to the interleaving matrix, coded bits of the channel quality information are located in at least one row at the top of all columns of the interleaving matrix.

Optionally, the UCI includes the RI and the HARQ-ACK information, and after the multiplexed bit sequence is written to the interleaving matrix, C=1, 2, or 3, coded bits of the RI are located in at least one row at the end of a $k^{th}$ column of the interleaving matrix, and the coded bits of the HARQ-ACK information are located in the $k^{th}$ column of the interleaving matrix and are located in at least one row above the coded bits of the RI, where k is a positive integer not greater than C; or C is greater than 1, and coded bits of the RI information and the coded bits of the HARQ-ACK information are located in different columns of the interleaving matrix.

Optionally, the UCI includes the channel quality information, the RI, and the HARQ-ACK information, and C is greater than 1; and after the multiplexed bit sequence is written to the interleaving matrix, the coded bits of the RI and the coded bits of the HARQ-ACK information are located in different columns of the interleaving matrix, and the coded bits of the channel quality information are located in all columns of the interleaving matrix.

An implementation principle and beneficial effects of the network device provided in this embodiment are similar to the implementation principles and the beneficial effects of the method embodiments shown in FIG. 11 and FIG. 12. For distribution of the UCI in the multiplexed bit sequence, refer to the descriptions in FIG. 6 to FIG. 10 specifically, and details are not described herein again.

An embodiment of the present disclosure further provides a communications system, including a terminal device and a network device. The terminal device is configured to: encode uplink control information UCI to obtain coded bits of the UCI and encode data to obtain coded bits of the data; multiplex the coded bits of the UCI and the coded bits of the data to obtain a multiplexed bit sequence; and carry the multiplexed bit sequence on a physical uplink shared channel PUSCH, and send the PUSCH to the network device, where a length of a transmission time interval TTI of the UCI is less than or equal to 0.5 millisecond. The network device is configured to: receive the PUSCH sent by the terminal device; obtain the multiplexed bit sequence from the PUSCH, and demultiplex the multiplexed bit sequence to obtain the coded bits of the UCI and the coded bits of data; and decode the coded bits of the UCI and the coded bits of the data.

The communications system in this embodiment may be used to perform the technical solution of the method embodiment shown in FIG. 13, and implementation principles and technical effects thereof are similar and are not described herein again.

The communications system in this embodiment may be further used to perform the technical solutions of the method embodiments shown in FIG. 3 to FIG. 5, FIG. 11, and FIG. 12. Implementation principles and technical effects thereof are similar. For locations of various pieces of UCI in the multiplexed bit sequence, refer to the foregoing descriptions of FIG. 6 to FIG. 10. In addition, for content of this embodiment that is the same as content of the foregoing embodiments, refer to the descriptions in the foregoing embodiments, and details are not described herein again.

Persons of ordinary skill in the art may understand that all or some of the steps of the method embodiments may be implemented by a program instructing relevant hardware. The program may be stored in a computer-readable storage medium. When the program is executed, the steps of the method embodiments are performed. The foregoing storage medium includes: any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method, comprising:
    encoding uplink control information (UCI) to obtain coded bits of the UCI, wherein the coded bits of the UCI comprise coded bits of hybrid automatic repeat request-acknowledgment (HARQ-ACK) information; and
    encoding data to obtain coded bits of the data;
    multiplexing the coded bits of the UCI and the coded bits of the data to obtain a multiplexed bit sequence, wherein the coded bits of the HARQ-ACK information are discontinuously distributed in the multiplexed bit sequence; and
    sending a physical uplink shared channel (PUSCH) carrying the multiplexed bit sequence to a network device,
    wherein the PUSCH occupies M symbols in time domain, wherein M is a positive integer not greater than 7 and the multiplexing the coded bits of the UCI and the coded bits of the data to obtain a multiplexed bit sequence comprises:
    determining an interleaving matrix, wherein a quantity of columns of the interleaving matrix is C, a quantity of rows of the interleaving matrix is R, both C and R are positive integers, C is greater than or equal to M, R=T/C, T is a total quantity of bits of the multiplexed bit sequence, and T is a positive integer;
    mapping the coded bits of the UCI and the coded bits of the data to the interleaving matrix; and
    obtaining the multiplexed bit sequence from the interleaving matrix, and
    wherein the coded bits of the UCI further comprise coded bits of a rank indication (RI); and
    C equals to 2, and the coded bits of the HARQ-ACK information are located in a second column of the interleaving matrix, and the coded bits of the RI are located in a first column of the interleaving matrix.

2. The method according to claim 1, wherein a total quantity of bits of the multiplexed bit sequence is a sum of a quantity of the coded bits of the data and a quantity of the coded bits of the UCI.

3. The method according to claim 1, wherein the coded bits of the UCI further comprise at least one of: coded bits channel quality information or coded bits of a rank indication (RI).

4. The method according to claim 1, wherein the coded bits of the UCI further comprise coded bits of a rank indication (RI) or coded bits of channel quality information (CQI); and
    wherein the coded bits of the RI or the coded bits of the CQI are discontinuously distributed in a $k^{th}$ column or at least two columns of the interleaving matrix, and k is a positive integer.

5. The method according to claim 1, wherein multiplexing the coded bits of the UCI and the coded bits of the data to obtain the multiplexed bit sequence comprises:
    puncturing at least one of the coded bits of the data or at least one of coded bits in the interleaving matrix, and filling at least one of the punctured coded bits of the data or punctured coded bits of channel quality information with coded bits of the HARQ-ACK information.

6. The method according to claim 1, wherein the multiplexed bit sequence is carried on the PUSCH by performing scrambling, modulation, layer mapping, transform domain precoding, precoding, resource mapping, or SC-FDMA baseband signal generation on the multiplexed bit sequence.

7. A method comprising:
    receiving a physical uplink shared channel (PUSCH) from a terminal device, wherein the PUSCH carries uplink control information (UCI), wherein coded bits of the UCI comprise coded bits of hybrid automatic repeat request-acknowledgment (HARQ-ACK) information;
    obtaining a multiplexed bit sequence from the PUSCH, wherein the coded bits of the HARQ-ACK information are discontinuously distributed in the multiplexed bit sequence; and
    demultiplexing the multiplexed bit sequence to obtain coded bits of the UCI and coded bits of data; and
    decoding the coded bits of the UCI and the coded bits of the data,
    wherein the PUSCH occupies M symbols in time domain, wherein M is a positive integer not greater than 7 and the multiplexing the coded bits of the UCI and the coded bits of the data to obtain a multiplexed bit sequence comprises:
    determining an interleaving matrix, wherein a quantity of columns of the interleaving matrix is C, a quantity of rows of the interleaving matrix is R, both C and R are positive integers, C is greater than or equal to M, R=T/C, T is a total quantity of bits of the multiplexed bit sequence, and T is a positive integer;
    mapping the coded bits of the UCI and the coded bits of the data to the interleaving matrix; and
    obtaining the multiplexed bit sequence from the interleaving matrix, and
    wherein the coded bits of the UCI further comprise coded bits of a rank indication (RI), and
    C equals to 2, and the coded bits of the HARQ-ACK information are located in a second column of the interleaving matrix, and the coded hits of the RI are located in a first column of the interleaving matrix.

8. The method according to claim 7, wherein a total quantity of bits of the multiplexed bit sequence is a sum of a quantity of the coded bits of the data and a quantity of the coded bits of the UCI.

9. The method according to claim 7, wherein the coded bits of the UCI further comprise at least one of coded bits of channel quality information and coded bits of the a rank indication (RI).

10. The method according to claim 7, wherein
    the coded bits of the data are punctured based on a quantity of the coded bits of the HARQ-ACK information; or
    the coded bits of the data are performed rate matching based on a quantity of the coded bits of the HARQ-ACK information.

11. The method according to claim 9, wherein the coded bits of the UCI further comprise coded bits of a rank indication (RI) or coded bits of channel quality information (CQI); and wherein the coded bits of the RI or the coded bits of the CQI are discontinuously distributed in a $k^{th}$ column or at least two columns of a interleaving matrix, and k is a positive integer.

12. An apparatus comprising:

one or more processors, and a non-transitory storage medium configure to store program instructions that, when executed by the one or more processors, cause the apparatus to perform operations comprising:

encoding uplink control information (UCI) to obtain coded bits of the UCI, wherein the coded bits of the UCI comprises coded bits of hybrid automatic repeat request-acknowledgment (HARQ-ACK) information; and encoding data to obtain coded bits of the data;

multiplexing the coded bits of the UCI and the coded bits of the data to obtain a multiplexed bit sequence, wherein the coded bits of the HARQ-ACK information are discontinuously distributed in the multiplexed bit sequence; and sending a physical uplink shared channel (PUSCH) carrying the multiplexed bit sequence to a network device, wherein the PUSCH occupies M symbols in time domain, wherein M is a positive integer not greater than 7 and the multiplexing the coded bits of the UCI and the coded bits of the data to obtain a multiplexed bit sequence comprises:

determining an interleaving matrix, wherein a quantity of columns of the interleaving matrix is C, a quantity of rows of the interleaving matrix is R, both C and R are positive integers, C is greater than or equal to M, R=T/C, T is a total quantity of bits of the multiplexed bit sequence, and T is a positive integer;

mapping the coded bits of the UCI and the coded bits of the data to the interleaving matrix; and obtaining the multiplexed bit sequence from the interleaving matrix, and wherein the coded bits of the UCI further comprise coded bits of a rank indication (RI), and C equals to 2, and the coded bits of the HARQ-ACK information are located in a second column of the interleaving matrix, and the coded bits of the RI are located in a first column of the interleaving matrix.

13. The apparatus according to claim 12, wherein a total quantity of bits of the multiplexed bit sequence is a sum of a quantity of the coded bits of the data and a quantity of the coded bits of the UCI.

14. The apparatus according to claim 12, wherein the coded bits of the UCI further comprises at least one of coded bits of channel quality information and coded bits of the a rank indication (RI).

15. The apparatus according to claim 12, the instructions, when executed by the one or more processors, further cause the apparatus to perform operations comprising:

puncturing the coded bits of the data based on a quantity of the coded bits of the HARQ-ACK information; or performing rate matching on the coded bits of the data based on a quantity of the coded bits of the HARQ-ACK information.

16. The apparatus according to claim 12, wherein the coded bits of the UCI further comprise coded bits of a rank indication (RI) or coded bits of channel quality information (CQI); and wherein the coded bits of the RI or the coded bits of the CQI are discontinuously distributed in a $k^{th}$ column or at least two columns of the interleaving matrix, and k is a positive integer.

* * * * *

UNITED STATES PATENT AND TRADEMARK OFFICE
CERTIFICATE OF CORRECTION

| | | |
|---|---|---|
| PATENT NO. | : 11,595,978 B2 | Page 1 of 1 |
| APPLICATION NO. | : 17/131643 | |
| DATED | : February 28, 2023 | |
| INVENTOR(S) | : Chaojun Li et al. | |

It is certified that error appears in the above-identified patent and that said Letters Patent is hereby corrected as shown below:

In the Claims

Column 44, Claim 7, Line 50 change "hits" to --bits--.

Signed and Sealed this
Twenty-eighth Day of March, 2023

Katherine Kelly Vidal
*Director of the United States Patent and Trademark Office*